United States Patent [19]
Bales et al.

[11] Patent Number: 5,375,167
[45] Date of Patent: Dec. 20, 1994

[54] TELECOMMUNICATION SWITCHING SYSTEM HAVING DISTRIBUTED DIALING PLAN HIERARCHY

[75] Inventors: Bruce M. Bales, Louisville; Robert L. Crumpley, Westminster; Sandra S. North, Golden; Stephen M. Thieler, Boulder, all of Colo.

[73] Assignee: AT&T Corp., Murray Hill, N.J.

[21] Appl. No.: 816,361

[22] Filed: Dec. 30, 1991

[51] Int. Cl.[5] .................. H04M 3/42; H04M 7/00; H04J 3/12
[52] U.S. Cl. .................. 379/207; 370/110.1; 379/219; 379/224; 379/230
[58] Field of Search .............. 370/60.1, 94.1, 110.1; 379/201, 207, 219, 220, 221, 230, 94, 112, 225, 224, 269

[56] References Cited

U.S. PATENT DOCUMENTS

| | | | |
|---|---|---|---|
| 4,442,321 | 4/1984 | Stehman | 379/225 X |
| 4,878,216 | 10/1989 | Yunoki | 370/60 |
| 4,896,319 | 1/1990 | Lidinsky et al. | 370/60 |
| 4,899,333 | 2/1990 | Roediger | 370/60 |
| 4,931,941 | 6/1990 | Krishnan | 379/113 X |
| 4,988,209 | 1/1991 | Davidson et al. | 370/58.2 |
| 5,001,710 | 3/1991 | Gawrys et al. | 370/110.1 |
| 5,012,512 | 4/1991 | Basso et al. | 379/218 |
| 5,014,266 | 5/1991 | Bales et al. | 370/60.1 |
| 5,016,243 | 5/1991 | Fite, Jr. | 370/16 |
| 5,023,780 | 6/1991 | Brearley | 364/200 |
| 5,023,868 | 6/1991 | Davidson et al. | 370/62 |
| 5,036,535 | 7/1991 | Gechter et al. | 379/210 |
| 5,051,992 | 9/1991 | Taniguchi et al. | 370/110.1 |
| 5,062,103 | 10/1991 | Davidson et al. | 370/58.1 |

*Primary Examiner*—James L. Dwyer
*Assistant Examiner*—Harry S. Hong
*Attorney, Agent, or Firm*—John C. Moran

[57] ABSTRACT

A system for distributing a numbering plan to switching nodes which are organized in a dialing plan hierarchy and for allowing an individual switching node to redistribute blocks of numbers to other switching nodes upon requests from those switching nodes to own the requested blocks of numbers. Further, the dialing plan hierarchy is automatically established upon system initialization with each switching node determining its position in that hierarchy. In addition, a switching node that needs to use only one number of a block owned by another switching node can request permission from the other switching node to use that telephone number for a telephone connected to the switching node. Such a use is referred to as hosting the telephone number. Hosting allows a telephone connected to one switching node to have a telephone number owned by another switching node and eliminates the constraint of requiring every telephone connected to a switching node to use a number from the block of numbers own by that switching node.

21 Claims, 24 Drawing Sheets

NODE HIERACHY

DIALING PLAN HIERACHY

FIG. 6

LEVEL 5 ROUTING TABLE 601 NODE 102

| TEL # | NODE |
|---|---|
|  |  |

LEVEL 4 ROUTING TABLE 602 NODE 102

| NODE # | LDC OF | # OF HOPS |
|---|---|---|
| 101 | 150 | 1 |
| 106 | 160 | 1 |

LEVEL 5 ROUTING TABLE 603 NODE 101

| TEL # | NODE |
|---|---|
|  |  |

LEVEL 4 ROUTING TABLE 604 NODE 101

| NODE # | LDC OF | # OF HOPS |
|---|---|---|
| 102 | 150 | 1 |
| 104 | 155 | 1 |
| 105 | 151 | 1 |
| 111 | 153 | 1 |
| 112 | 152 | 1 |

FIG. 7

DIALING PLAN TABLE 708 NODE 102

| TEL # | NODE # | OWNERSHIP | STATUS |
|---|---|---|---|
| 1XXX | 101 | 2 | 1 |
| XXXX | NMS | 1 | 1 |

LEVEL 5 ROUTING TABLE 706-NODE 102

| TEL # | NODE |
|---|---|
| 1XXX | 101 |
| XXXX | 102 |

LEVEL 4 ROUTING TABLE 707 NODE 102

| NODE # | LDC OF | # OF HOPS |
|---|---|---|
| 101 | 150 | 1 |
| 106 | 160 | 1 |

DIALING PLAN TABLE 711 NODE 101

| TEL # | NODE # | OWNERSHIP | STATUS |
|---|---|---|---|
| 1XXX | 102 | 1 | 1 |

LEVEL 5 ROUTING TABLE 709-NODE 101

| TEL # | NODE |
|---|---|
| 1XXX | 101 |
| XXXX | 102 |

LEVEL 4 ROUTING TABLE 710 NODE 101

| NODE # | LDC OF | # OF HOPS |
|---|---|---|
| 102 | 150 | 1 |
| 104 | 155 | 1 |
| 105 | 151 | 1 |
| 111 | 153 | 1 |
| 112 | 152 | 1 |

FIG. 9

DIALING PLAN TABLE 910 FOR NODE 104

| TEL # | NODE # | OWNERSHIP | STATUS |
|---|---|---|---|
| 20XX | 109 | 2 | 1 |
| 21XX | 110 | 2 | 1 |
| 2XXX | 102 | 1 | 1 |

LEVEL 5 ROUTING TABLE 911 FOR NODE 104

| TEL # | NODE |
|---|---|
| 20XX | 109 |
| 21XX | 110 |
| 2XXX | 104 |
| XXXX | 102 |

LEVEL 4 ROUTING TABLE 912 FOR NODE 104

| NODE # | LDC OF | # OF HOPS |
|---|---|---|
| 101 | 155 | 1 |
| 102 | 155 | 2 |
| 109 | 158 | 1 |
| 110 | 159 | 1 |
| 111 | 154 | 1 |

LEVEL 5 ROUTING TABLE 913–NODE 101

| TEL # | NODE |
|---|---|
| 10XX | 105 |
| 11XX | 112 |
| 12XX | 111 |
| XXXX | 102 |

LEVEL 4 ROUTING TABLE 914 NODE 101

| NODE # | LDC OF | # OF HOPS |
|---|---|---|
| 102 | 150 | 1 |
| 104 | 155 | 1 |
| 105 | 151 | 1 |
| 111 | 153 | 1 |
| 112 | 152 | 1 |

DIALING PLAN TABLE 915 FOR NODE 109

| TEL # | NODE # | OWNERSHIP | STATUS |
|---|---|---|---|
| 20XX | 104 | 2 | 1 |

LEVEL 5 ROUTING TABLE 916–NODE 109

| TEL # | NODE |
|---|---|
| 20XX | 109 |
| 2XXX | 104 |

LEVEL 4 ROUTING TABLE 917 FOR NODE 109

| NODE # | LDC OF | # OF HOPS |
|---|---|---|
| 104 | 158 | 1 |

DIALING PLAN TABLE 918 FOR NODE 111

| TEL # | NODE # | OWNERSHIP | STATUS |
|---|---|---|---|
| 12XX | 101 | 1 | 1 |

LEVEL 5 ROUTING TABLE 919–NODE 111

| TEL # | NODE |
|---|---|
| 12XX | 111 |
| 1XXX | 101 |

LEVEL 4 ROUTING TABLE 920 FOR NODE 111

| NODE # | LDC OF | # OF HOPS |
|---|---|---|
| 101 | 153 | 1 |
| 104 | 154 | 1 |
| 112 | 166 | 1 |

FIG. 10

LEVEL 5 ROUTING TABLE 1005-NODE 104

| TEL # | NODE |
|---|---|
| 12XX | 111 |
| 20XX | 109 |
| 21XX | 110 |
| 2XXX | 104 |
| XXXX | 102 |

LEVEL 4 ROUTING TABLE 1006 NODE 104

| NODE # | LDC OF | # OF HOPS |
|---|---|---|
| 101 | 155 | 1 |
| 102 | 155 | 2 |
| 109 | 158 | 1 |
| 110 | 159 | 1 |
| 111 | 154 | 1 |
| 111 | 155 | 2 |

— 1003

LEVEL 5 ROUTING TABLE 1007-NODE 109

| TEL # | NODE |
|---|---|
| 12XX | 111 |
| 20XX | 109 |
| 2XXX | 104 |

1001

LEVEL 4 ROUTING TABLE 1008 NODE 109

| NODE # | LDC OF | # OF HOPS |
|---|---|---|
| 104 | 158 | 1 |
| 111 | 158 | 3 |

— 1002

LEVEL 5 ROUTING TABLE 1009-NODE 111

| TEL # | NODE |
|---|---|
| 12XX | 111 |
| 1XXX | 101 |

LEVEL 4 ROUTING TABLE 1010 NODE 111

| NODE # | LDC OF | # OF HOPS |
|---|---|---|
| 101 | 153 | 1 |
| 104 | 154 | 1 |
| 112 | 166 | 1 |

FIG. 11

DIALING PLAN TABLE FOR NODE 112

| TEL # | NODE # | OWNERSHIP | STATUS |
|---|---|---|---|
| 11XX | 101 | 1 | 1 |
| 1205 | 111 | 1 | 1 |

LEVEL 5 ROUTING TABLE 1102-NODE 112

| TEL # | NODE |
|---|---|
| 11XX | 112 |
| 1205 | 112 |
| 12XX | 111 |
| 1XXX | 101 |

LEVEL 4 ROUTING TABLE 1103 FOR NODE 112

| NODE # | LDC OF | # OF HOPS |
|---|---|---|
| 101 | 152 | 1 |
| 111 | 166 | 1 |

DIALING PLAN TABLE FOR NODE 111

| TEL # | NODE # | OWNERSHIP | STATUS |
|---|---|---|---|
| 1205 |  | 2 | 1 |
| 12XX | 101 | 1 | 1 |

LEVEL 5 ROUTING TABLE 1104-NODE 111

| TEL # | NODE |
|---|---|
| 1205 | 112  ← 1101 |
| 12XX | 111 |
| 1XXX | 101 |

LEVEL 4 ROUTING TABLE 1105 FOR NODE 111

| NODE # | LDC OF | # OF HOPS |
|---|---|---|
| 101 | 153 | 1 |
| 104 | 154 | 1 |
| 112 | 166 | 1 |

FIG. 12

LEVEL 5 ROUTING TABLE 1201-NODE 104

| TEL # | NODE |
|---|---|
| 11XX | 112 |
| 12XX | 111 |
| 20XX | 109 |
| 21XX | 110 |
| 2XXX | 104 |
| XXXX | 102 |

LEVEL 4 ROUTING TABLE 1202 FOR NODE 104

| NODE # | LDC OF | # OF HOPS |
|---|---|---|
| 101 | 155 | 1 |
| 102 | 155 | 2 |
| 109 | 158 | 1 |
| 110 | 159 | 1 |
| 111 | 154 | 1 |
| 111 | 155 | 2 |
| 112 | 154 | 2 |

LEVEL 5 ROUTING TABLE 1203-NODE 109

| TEL # | NODE |
|---|---|
| 11XX | 112 |
| 12XX | 111 |
| 20XX | 109 |
| 2XXX | 104 |

LEVEL 4 ROUTING TABLE 1204 FOR NODE 109

| NODE # | LDC OF | # OF HOPS |
|---|---|---|
| 104 | 158 | 1 |
| 111 | 158 | 3 |
| 112 | 158 | 4 |

LEVEL 5 ROUTING TABLE 1205-NODE 111

| TEL # | NODE |
|---|---|
| 11XX | 112 |
| 12XX | 111 |
| 1XXX | 101 |

LEVEL 4 ROUTING TABLE 1206 FOR NODE 111

| NODE # | LDC OF | # OF HOPS |
|---|---|---|
| 101 | 153 | 1 |
| 104 | 154 | 1 |
| 112 | 166 | 1 |

FIG. 13

| | NODE IDENTIFICATION | |
|---|---|---|
| | NETWORK NUMBER | SWITCHING NODE |
| 1301 → | XX.XX.XX.0.0.0 | 101 |
| 1302 → | XX.XX.XX.1.0.0 | 102 |
| | XX.XX.XX.1.1.0 | 106 |
| | XX.XX.XX.1.1.1 | 107 |
| | XX.XX.XX.1.1.2 | 108 |
| | XX.XX.XX.2.0.0 | 104 |
| | XX.XX.XX.2.1.0 | 109 |
| | XX.XX.XX.2.2.0 | 110 |
| 1303 → | XX.XX.XX.3.0.0 | 105 |
| | XX.XX.XX.4.0.0 | 111 |
| 1304 → | XX.XX.XX.5.0.0 | 112 |

TELECOMMUNICATION SWITCHING SYSTEM HAVING DISTRIBUTED DIALING PLAN HIERARCHY

CROSS-REFERENCE TO RELATED APPLICATIONS

B. M. Bales, R. L. Crumpley, S. S. North, and S. M. Thieler, Case 9-5-5-5, "Automatic Initialization of a Distributed Telecommunication System" U.S. patent application Ser. No. 07/816,360;

B. M. Bales, R. L. Crumpley, S. S. North, and S. M. Thieler, Case 12-8-7-8, "Redirection of Calls by a Communication Terminal" U.S. patent application Ser. No. 07/816,363;

B. M. Bales, R. L. Crumpley, S. S. North, and S. M. Thieler, Case 13-9-8-9, "Rerouting in a Distributed Telecommunication System" U.S. patent application Ser. No. 07/816,359; and B. M. Bales, R. L. Crumpley, S. S. North, and S. M. Thieler, Case 14-10-9-10, "Telecommunication Switching System Having Adaptive Routing Switching Nodes" U.S. patent application Ser. No. 07/816,362.

These applications are filed concurrently with this application and are assigned to the same assignee.

TECHNICAL FIELD

This invention relates to a telecommunication switching system having a plurality of distributed switching nodes, and, in particular, to the distribution of telephone numbers among the switching nodes.

BACKGROUND OF THE INVENTION

In a prior art telecommunication switching system comprising a plurality of switching nodes, each switching node requires predefined knowledge of the numbering plan of the telecommunication switching system and also of how the switching nodes are interconnected. An example of such a system is the public telephone network in the United States. Within the United States, the telephones are grouped in terms of area codes; and within each area code, the telephone numbers are further grouped by the first three digits of the telephone number. The telecommunication system itself involves tandem switching systems and central office switching systems. Each central office system is responsible for groups of telephone numbers with each group being specified by the first three digits of the telephone number. This hierarchy of telephone numbers (also referred to as the dialing plan hierarchy) is modeled after the hierarchy of switching nodes, e.g. central and tandem offices. Within each central office, the routes to be utilized to reach area codes or other groups of telephone numbers is predefined at system initialization or during system operation by the actions of a system administrator. Telephones locally connected to a central office must be assigned a number from the predefined block of numbers assigned to the central office. One problem with the prior art is that a new telephone number must be manually assigned to a person every time a person moves by a system administrator at a new central office since the new telephone number must be from the telephone numbers assigned to that central office.

U.S. Pat. No. 4,442,321 discloses a distributed dialing plan in which the dialing plan is distributed to switching systems in a horizontal manner such that each switching system (switching node) occupies the same hierarchical level as any other switching systems. The switching systems are interconnected by links, and a switching system is assigned a block of telephone numbers. To place a call with a dialed telephone number received from a connected telephone, the switching system determines if the dialed telephone number is part of the telephone numbers assigned to the switching system or is part of a block owned by another switching system. This decision is based on the most significant digits of the dialed telephone number. If the dialed telephone number belongs to another switching system, the switching system searches an internal table to determine which link interconnects the switching system to the other switching system and uses that link to route the call to the other switching system. The problem with this distributed dialing plan is that every switching system has to have predefined information defining the blocks of numbers owned by all of the other switching systems.

SUMMARY OF THE INVENTION

The foregoing problems are solved, and a technical advance is achieved by an apparatus and method for distributing the numbering plan to switching nodes which are organized in a dialing plan hierarchy and for allowing an individual switching node to redistribute blocks of numbers to other switching nodes upon requests from those switching nodes to own blocks of numbers. Furthermore, the dialing plan hierarchy is automatically established upon system initialization with each switching node determining its position in that hierarchy. In addition, a switching node that needs to use only one number of a block owned by another switching node can request permission from the other switching node to use that telephone number. Such a use is referred to as hosting the telephone number. Hosting allows a telephone connected to one switching node to have a telephone number owned by another switching node and eliminates the constraint of requiring every telephone connected to a switching node to use a number from the block of numbers owned by that switching node.

Each switching node is informed by a network management system of the blocks of numbers each switching node is to own. This arranges the switching nodes into hierarchical groups with one switching node in the highest hierarchical group owning all of the blocks upon initialization. Also, upon initialization, each switching node in a lower hierarchical group requests permission to own one or more blocks of numbers from a switching node in a higher hierarchical group. Each switching node upon receiving such a request gives permission to the requesting switching node to own the requested blocks of numbers. Upon giving permission, each switching node records the switching node number of the requesting switching node, and each receiving switching node records the switching node number of switching node giving permission. This recording allows routing to be performed with a dialed telephone number by using the dialed number to route the call up the hierarchy until a level is reached where a path is available down the hierarchy to a switching node connected to the dialed telephone. In addition, when a switching node gives permission to another switching node to host a number, the switching node records the switching node number of the other switching node and identification of the hosted number.

BRIEF DESCRIPTION OF THE DRAWING

FIGS. 6 and 7 illustrate routing tables utilized by the switching nodes;

FIGS. 9 through 12 illustrate routing tables utilized by the switching nodes of FIG. 1;

FIG. 13 illustrates the physical layout of a node number of a switching node;

DETAILED DESCRIPTION

Figure 1:
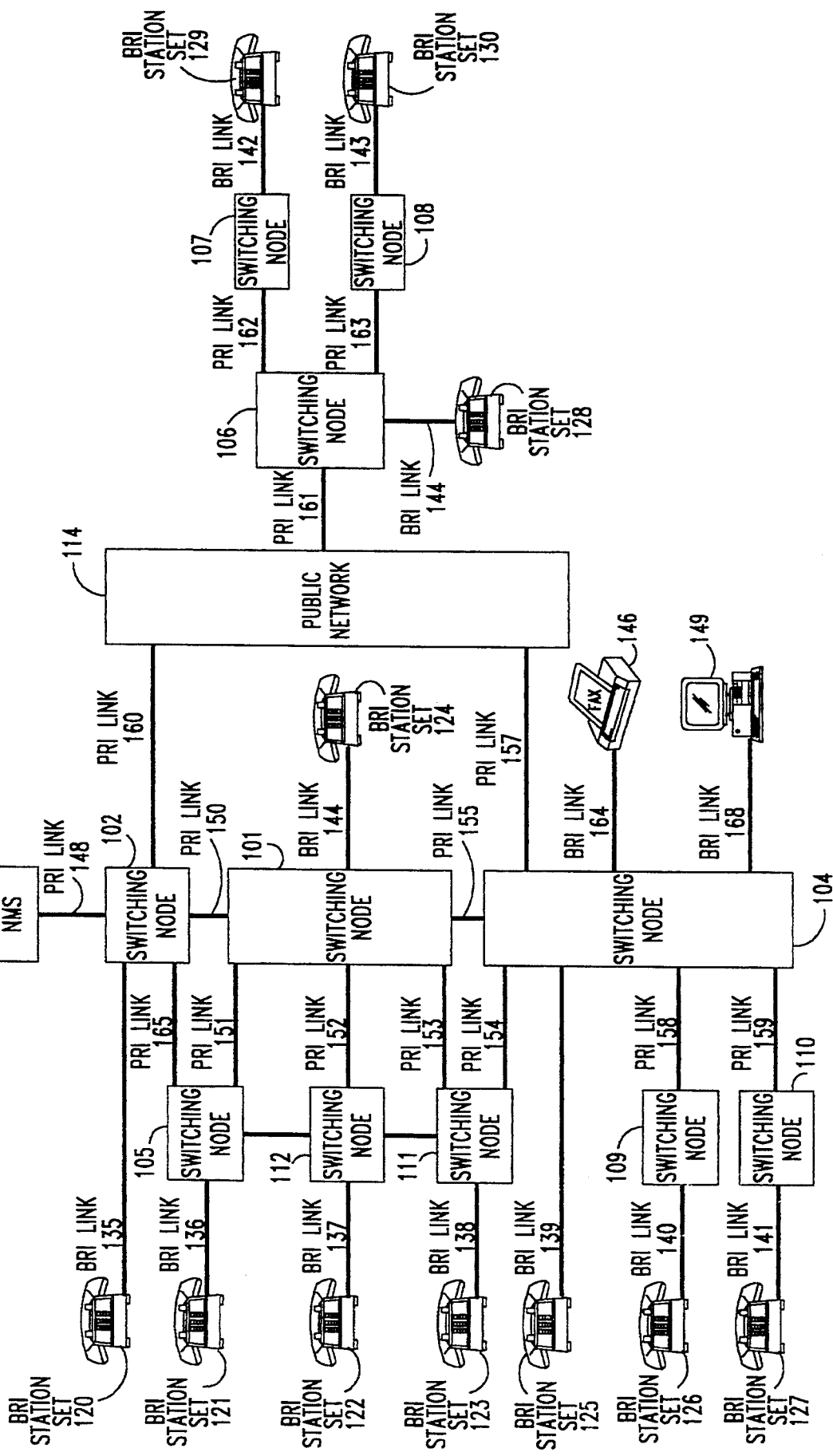
FIG. 1 illustrates, in block diagram form, a telecommunication switching system embodying the inventive concept.
Figure 2:
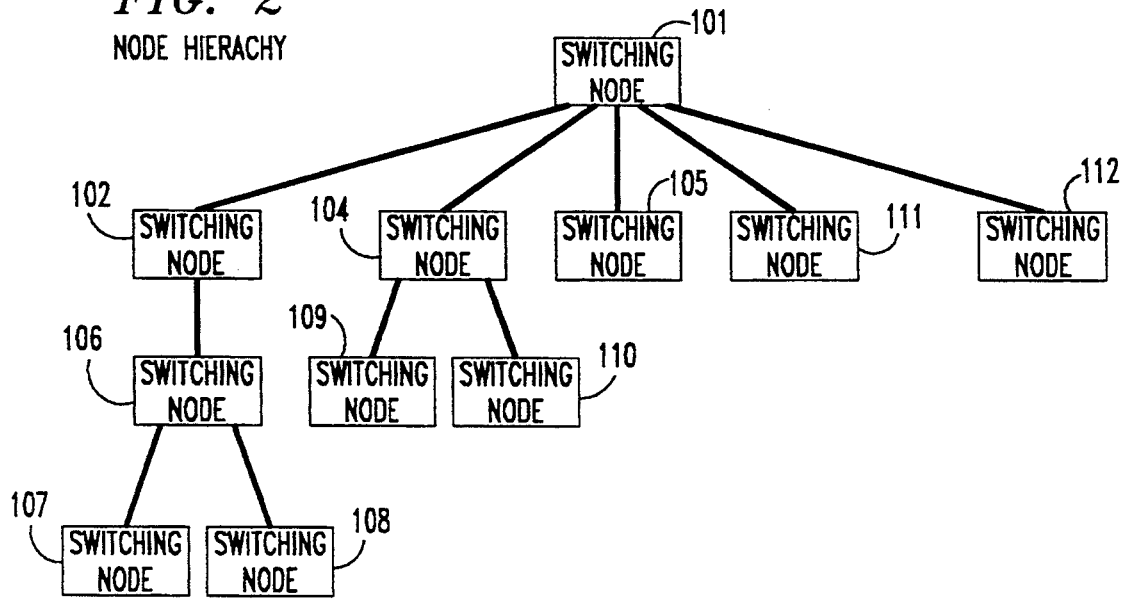
FIG. 2 illustrates the node hierarchy of the switching nodes of FIG. 1.
Figure 3:
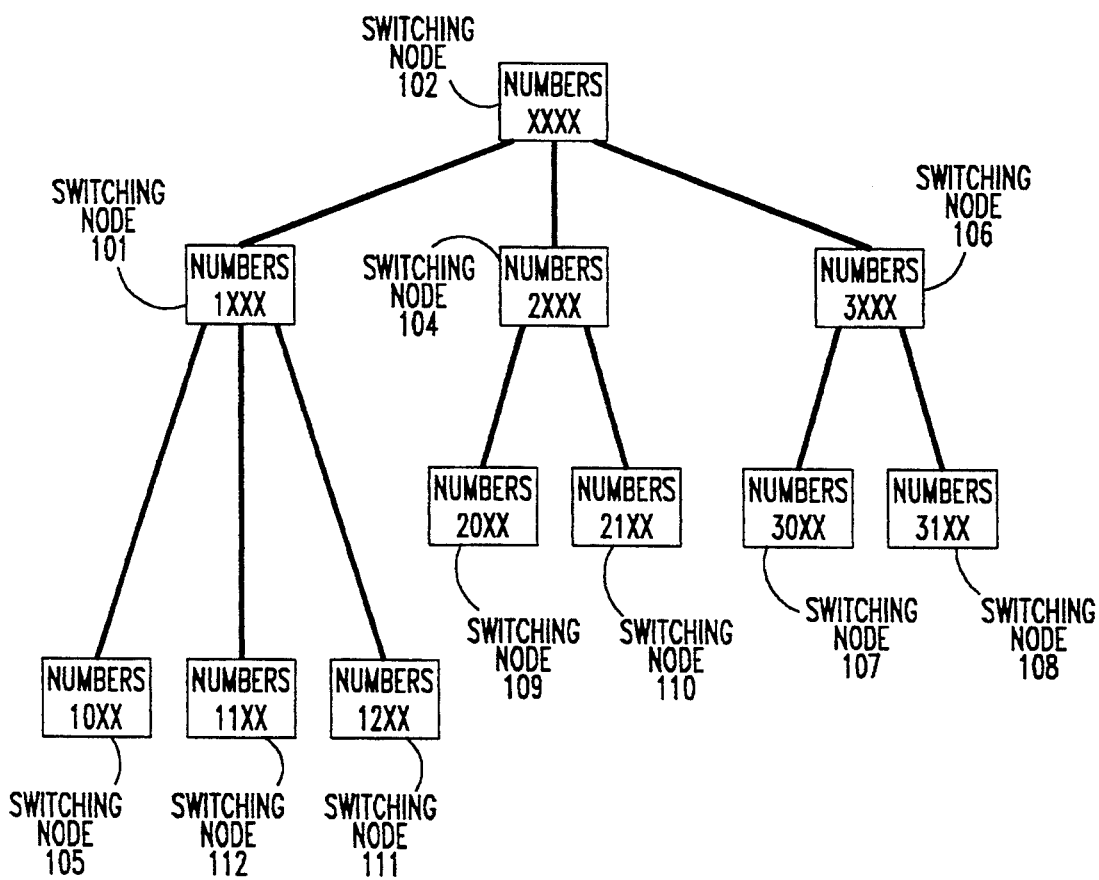
FIG. 3 illustrates the dialing plan hierarchy of the switching nodes of FIG. 1.

FIG. 1 shows a telecommunication switching system having a plurality of switching nodes 101 through 112 with a network management system (NMS) 115. Each of the switching nodes 101 through 112 provides communication for a plurality of telecommunication terminals such as BRI station sets 120 through 130. Advantageously, the switching nodes of FIG. 1 function as an integrated system to provide telecommunication services such as those provided by an individual or network of AT&T Definity Generic II communication systems. Switching nodes 106, 107, and 108 are interconnected to the other switching nodes via public network 114 and are providing telecommunication services to a group of people who are geographically remote from the people served by the other switching nodes. Unlike a prior art system of switching nodes such as a network of Definity Generic II communication systems, a switching node of FIG. 1, in accordance with the invention, has no predefined stored information defining communication paths through the telecommunication system illustrated in FIG. 1, such as, a communication path from BRI station set 120 to BRI station set 127. After initialization, each switching node does have information that defines its position within the dialing plan hierarchy and its position within the switching node hierarchy. These two hierarchies are illustrated in FIGS. 2 and 3. Note, that there is no requirement that a switching node's position in the switching node hierarchy be the same as its position in the dialing plan hierarchy. For example, switching node 111 is in the second highest level of the switching node hierarchy but is in the lowest level of the dialing plan hierarchy as illustrated in FIGS. 2 and 3, respectively. In addition, each switching node knows the switching node number of the other switching nodes which are directly connected to it. For example, switching node 104 knows the switching node number of switching nodes 101, 109, 110, and 111 and the PRI links to establish communications with each of these other switching nodes. After utilizing the switching node and dialing plan hierarchies to route a call for example from BRI station set 127 to BRI station set 120, the terminating switching node 102 includes information defining its understanding of the dialing plan hierarchy in the acknowledge message which is transmitted back to switching node 110 in response to the initial message (setup message) transmitted by switching node 110. In addition, each switching node in the communication path between the two BRI station sets also inserts into the acknowledge message its information concerning the switching node hierarchy. When the acknowledge message is received back by switching node 110, the latter switching node stores this information for use in the establishment of calls not only to BRI station sets attached to switching node 102 but to any call that may need to be established. More detailed information describing call routing is given in the section entitled "Call Routing".

Overview

In accordance with the invention, the dialing plan is distributed to each switching node using a dialing plan hierarchy. Each switching node determines routing information upon the entire system being initialized or upon an individual switching node being initialized by first using the structure of the switching node and dialing plan hierarchies to route calls and then using information returned to a switching node each time it establishes a call to another switching node to learn adaptively the most efficient communication paths through the telecommunication system illustrated in FIG. 1. In addition, each switching node is responsive to a new telecommunications link (BRI or PRI link) becoming active and to adapt to a more efficient communication path that may be allowed by the activation of an individual telecommunication link. To understand how the call routing is performed, it is necessary to understand in greater detail the switching node hierarchy, dialing plan hierarchy, and the initialization of each individual switching node. The following is an overview of the functions that are performed by each switching node and NMS 115 during initialization and the adaptive learning of call routing. To reach the point where adaptive call routing may be performed, each switching node as it becomes active must perform the following functions: (1) establish its own internal configuration, (2) identify and initialize interfaces, (3) establish its position in the switching node hierarchy, (4) establish the dialing plan hierarchy, and (5) learn how to route calls through the system. Each of these functions is described in general terms in the remainder of this section, and detailed descriptions are given in the following sections: the first function in "Internal Configuration Identification", the second function in "Initialization and Identification of Interfaces", the third function, in "Node Hierarchy Identification", the fourth function in "Dialing Plan Initialization", and the fifth function in "Call Routing". In addition, NMS 115 must establish a call to each switching node in order to distribute the dialing plan among the switching nodes and provide other management functions. The function performed by NMS 115 is described in detail in the section entitled "System Network Management Initialization".

To illustrate these functions, consider the actions performed by switching node 102 in performing the first three functions. To accomplish the first function, switching node 102 establishes its own internal configuration with respect to the number of internal control processors (also referred to as angel processors), type of internal switching networks, physical packaging (card carriers), and number and type of link interfaces. After each of these entities becomes initialized and runs elementary diagnostic routines on itself, it signals the node processor (the main processor within a switching node, e.g., node processor 510 of FIG. 5) of its existence.

To accomplish the second function (identify and initialize interfaces), each interface attempts independently to establish ISDN signaling across the link in switching node 102 attached to that interface. For example, the interface in switching node 102 attached to PRI link 150 attempts to establish the first two levels of ISDN protocol with the corresponding interface in switching node 101 attached to PRI link 150. Interfaces in switching node 102 that are attached to PRI links 148, 150, and 160 and BRI link 135 also start initialization ISDN signaling on their respective links. In addition to the interfaces connected with the PRI links establishing ISDN signaling, the interface connected to BRI link 135 within switching node 102 establishes signaling with BRI station set 120. With respect to the BRI links, switching node 102 also performs a terminal endpoint identification (TEI) assignment procedure to identify station sets such as BRI station set 120. BRI station set 120 stores information defining its own identification number which in turn identifies its number within the dialing plan and its feature set. This information is communicated to switching node 102 and used by switching node 102 to make BRI station set 120 operational.

The third function (establish the position of a switching node in switching node hierarchy) is accomplished by switching node 102 exchanging node numbers with switching node 101 after ISDN signaling has been established via PRI link 150. Each node number uniquely defines its switching node with respect to position in the switching node hierarchy. After the exchange of node numbers, switching node 102 immediately seeks to find the switching node which is next highest to it in the node hierarchy. In the present illustrative embodiment.

FIG. 2 illustrates the switching node hierarchy. In the system of FIG. 1, switching node 101 is the highest switching node in the node hierarchy. Switching nodes 102, 104, 105, 112, and 111 are directly subordinate to switching node 101. Switching node 102 easily finds its switching node higher in the hierarchy since switching node 102 is directly connected to switching node 101.

Before the fourth function (establish the dialing plan hierarchy) can be accomplished by a switching node, NMS 115 must have distributed to that initializing switching node and to switching nodes higher in the dialing plan hierarchy than the initializing switching node, information assigning portions of the dialing plan that will belong to those switching nodes. However, NMS 115 does not give ownership of the numbers. For example, as illustrated in FIG. 3, since switching node 102 is the highest node in dialing plan hierarchy, NMS 115 only needs to distribute the plan to switching node 102. For switching node 111, the dialing plan portions have to be distributed to switching nodes 102, 101 and 111 before switching node 111 can perform the fourth function.

To perform the dial plan distribution, NMS 115 must initialize the system management structure which comprises a switching network manager application in NMS 115 and system management applications in each of the switching nodes. The first step in the system network management initialization is for NMS 115 to place a call over PRI link 148 to the system management application running in switching node 102. NMS 115 determined the existence of switching node 102 during the initialization of PRI link 148. (NMS 115 performs self initialization similar to a switching node with respect to interfaces.) NMS 115 utilizes the system management application of switching node 102 to extract information concerning what links are active on switching node 102 and to determine to which switching nodes these links are connected. Based on the node numbers received from switching node 102, NMS 115 determines to which switching nodes it needs to establish contact.

In order to obtain information from switching node 101, NMS 115 places a call through switching node 102 to the system management application of switching node 101. (All system management applications have the same, telephone number and are differentiated on the basis of the node number.) The system network manager application running in NMS 115 uses this technique of calling through intermediate nodes to establish a session with the system management application in each of the switching nodes.

In order to establish communications with switching nodes 106, 107, and 108, which are interconnected with the remainder of the system by public network 114, the switching network manager application transmits information to switching node 102 to cause that node to establish a flexible rate interface (FRI) link via PRI link 160, public network 114, and PRI link 161 with switching node 106. The manner in which a FRI link is established is set forth in the patent application entitled, "A Switching System Using Identical Switching Nodes", application Ser. No. 07/636,521, filed Dec. 31, 1990, having the same inventors and assignee as the present application. Once the FRI link is established, the system network manager application can establish a session with each of system management applications in switching nodes 106, 107, and 108. After establishment of the FRI link, switching node 106 can also establish its relationship in the node hierarchy to switching node 102.

As soon as the switching management application running in NMS 115 has established a session with the system management application in switching node 102 (in the present example), the dialing plan management application also running in NMS 115 informs switching node 102 which portion of the dialing plan switching node 102 is to own. The dialing plan management application in NMS 115 utilizes the routing information obtained by the switching network manager application in NMS 115 during the process of initializing the system management structure. Using this routing, the dialing plan management application establishes a session with the dialing plan application running in switching node 102 by placing a call to the dialing plan application.

As illustrated in FIG. 3, the dialing plan has a hierarchical structure in which certain switching nodes will own a larger portion of the numbers in the dialing plan than other switching nodes. The larger the portion of numbers owned by a switching node, the higher in dialing plan hierarchy that switching node is. A switching node owning a larger portion can also give other nodes groups of dialing plan numbers from that portion to own. The dialing plan is distributed in contiguous blocks of numbers to the switching nodes. In the present example, switching node 102 is the highest node in the dialing plan management hierarchy and is assigned all of the numbers utilized by the system illustrated in FIG. 1. Switching node 101 is assigned blocks of numbers defined by "1XXX" where the "X" denotes a don't care digit. However, switching nodes 105, 112, and 111 are also notified that they are to own three of the blocks, 10XX, 11XX, 12XX, respectively, that are presently owned by switching node 101.

To accomplish the fourth function (establish the distributed dialing plan) in accordance with invention, each switching node upon being notified that is should own a certain block of numbers finds its superior switching node in the dialing plan hierarchy by placing a call to its superior switching node and must ask permission from the superior switching node to own that block of numbers. For example, switching node 101 asks permission from switching node 102 to own the 1XXX block. Similarly, switching node 105 requests permission from switching node 101 to own the block that switching node 105 has been assigned. These requests are made by placing calls through the system to the dialing plan application of the higher switching node in the dialing plan hierarchy that controls the block being requested. For example, the dialing plan application of switching node 104 must place a call to switching node 101 requesting a connection to the dialing plan application of switching node 102 in order for switching node 104 to get permission to own its block of numbers.

As a system is being brought up, the dialing plan may not be distributed to the higher nodes in the dialing plan hierarchy before nodes lower in the dialing plan hierarchy are requesting permission to own a particular block of numbers. When this occurs, the request is refused, and the requesting switching node tries at a later point in time.

During the initialization of the network management hierarchy and the dialing plan hierarchy which is part of the fourth function, the TEI assignment procedure of the second function has also been progressing with respect to the BRI station sets. This procedure is controlled by a terminal management application running in each node. As part of the procedure, the terminal management application requests the service profile ID (SPID) information from a BRI station set. The SPID information identifies the terminal service profile (TSP) which defines the directory numbers plus features of the station set. The SPID information must be verified with the dialing plan application of the node with respect to assignment of the directory number. In turn, the terminal management application must receive the service profile information from the system network management application in NMS 115. These procedures do not have to occur simultaneously. However, once the number has been verified with the dialing plan application, the switching node allows the station set to perform a specified restricted set of functions until the full set of functions can be received from the system network management application. This feature allows the switching node to provide limited service until NMS 115 provides the directory numbers and features.

When the terminal management application requests from the local dialing plan application permission to use a particular number, that dialing plan application may not own the number, but rather, the number is from a number block given to a dialing plan application on another node. For example, this situation occurs when a BRI station set connected to switching node 102 has a number defined in its TSP but switching node 102 doesn't own the number block to which that number belongs. Switching node 102 must request permission from the other switching node owning the number to use but not own the number (referred to as hosting a number). Indeed, all numbers owned by a switching node may be hosted by other switching nodes. In order to host a number, the dialing plan application on switching node 102 must request permission from the dialing plan application of the other switching node to host this number. The owning dialing plan application records the fact that it has allowed the dialing plan application of switching node 102 to host the number and records the switching node on which that dialing plan application resides. To expand the hosting example, assume that BRI station set 120 (connected to switching node 102) has a number in the "10XX" block which is owned by switching node 105. Switching node 102 has to obtain permission from switching node 105 to host this number. The dialing plan application of switching node 105 records the fact that switching node 102 is hosting that particular number.

Until the service profile information can be received from the system network manager, each station set has only the features allowed by the restricted service profile. The restricted service profile gives the user of the station set basic functionality but this functionality is rather restrictive. The terminal management application within the node must request that the system management application in the node obtain the terminal service profile (TSP) from the system network manager application running in NMS 115. A session between the system network manager application and the system management application must have already had to have been set up by the fourth function. The obtaining of the TSP can take place at a much later point in time than the request to use a number since the station set has limited functionality already. When the system network manager application receives the TSP request, it sends down a complete service profile record which designates what services this particular station set is to be allowed to use.

To illustrate how the hosting and owning of numbers in the dialing plan functions consider the following example. In this example, BRI station set 123 which is connected to switching node 111 is to use a number which is in the block of numbers owned by switching node 105. When the terminal management application in switching node 111 receives the SPID from BRI station set 123, it requests permission from the dialing plan application executing in switching node 111 to use this number. The dialing plan application determines that it does not own the requested number and transmits a request (by establishing a call) to the dialing plan application on whatever switching node owns the number. This switching node is found (if not already known) by addressing the call to the number that switching node 111 wants to host and requesting the dialing plan application for that number. The call is then routed by various switching nodes to switching node 105. Switching node 105 then delivers the call to the dialing plan application in switching node 105.

The dialing plan application of switching node 111 then transmits a request to the dialing plan application of switching node of 105 for permission to host the number. The dialing plan application of switching node 105 transmits permission to switching node 111 for hosting the number, and switching node 105 marks in an internal table the fact that this number has been transferred to switching node 111 for the purposes of being hosted.

To perform the fifth function (learn how to route calls through the system), each individual switching node must obtain information on how to route calls through the remainder of the system after interfaces of the switching node have been established, the next highest switching node in the node hierarchy has been determined, the dialing plan has been distributed to this particular switching node, and the TEI assignment procedure has been performed on the BRI station sets. Each switching node initially learns of how the switching nodes are interconnected by using information concerning the dialing plan hierarchy and the node hierarchy. In addition, when a call is placed to a destination switching node by an originating switching node, the destination switching node includes, in the alerting message transmitted back to the originating switching node, the block of numbers owned by the destination switching node.

The following examples illustrate how switching nodes learn to route calls through the system. Consider the example where BRI station set 126 which is connected to switching node 109 places a call to BRI station set 123 which is connected to switching node 111. The number (1201) of BRI station set 123 is both owned and hosted by switching node 111. After the number is dialed on BRI station set 126, switching node 109 examines this number to determine the switching node to which a setup message should be transported. Since node 109 has just come up, it only knows its own block of numbers (20XX) and the block of numbers (2XXX) for switching node 104. Hence, switching node 109 transmits a setup message to switching node 104 which is higher than itself in the dialing plan hierarchy. The routing to switching node 104 can be easily accomplished since switching node 104 is directly connect to switching node 109 and during the initialization of PRI link 158, switching node 104 identified itself to switching node 109. Switching node 104 accepts the setup message from switching node 109, examines the message, and determines that it should route the call to switching node 102, since switching node 102 owns (at least originally) all numbers in the dialing plan. This information was obtained during the dialing plan initialization. Switching node 104 then establishes a path (by means of a call) through itself and directs the call to switching node 102 which is higher in the dialing plan hierarchy than switching node 104. To transfer the message to switching node 102, switching node 104 first routes the call to switching node 101 which is higher in the node hierarchy than switching node 104 as illustrated in FIG. 2. Switching node 101 examines the number and determines that the message is destined for switching node 102. Switching node 101 establishes a call through itself and then communicates the setup message to switching node 102. Switching node 102 determines from its internal tables that the dialed number is a member of the blocks of numbers given to switching node 101 as illustrated in FIG. 3. The call must be routed through switching node 101, but there is no need for the call to be routed from switching node 101 to switching node 102 and then back to switching node 101. To avoid this rerouting, switching node 102 changes the destination of the setup message to indicate switching node 101 and sends a redirect message back to switching node 101. In response to the redirect message, the latter switching node interrogates its internal tables using the dialed number, determines that the dialed number is a member of a block of numbers given to switching node 111, and transmits a setup message to switching node 111. (The redirect message is explained in detail in our copending U.S. patent application of B. M. Bales, et al. entitled "Rerouting in a Distributed Telecommunication System", filed on the same day as the present application, and having the same inventors and assignee as the present application.) Switching node 111 determines that the dialed number is that of BRI station set 123 and commences to alert BRI station set 123 of the call. In addition, switching node 111 transmits an alerting message which contains the node number and the block of numbers owned by switching node 111. As the alerting message is transferred back through the previous path (via switching nodes 104 and 101 ) that was just described, each switching node inserts its own node number into the alerting message. When switching node 109 receives the alerting message, it identifies the particular block of numbers as belonging to switching node 111, stores the path defined by the node numbers, stores the block of numbers owned by switching node 111, and alerts BRI station set 126 that BRI station set 123 is being alerted.

The next time that BRI station set 126 places a call to BRI station set 123, node 109 examines its internal tables and determines that the dialed number is to be routed to switching node 111. Consequently, switching node 109 transmits a setup message to switching node 104 designating (by including the node number of switching node 111) that the connection is to be made to switching node 111. Node 104 is responsive to the node number of node 111 in the setup message to use the node number for determining that it has a direct link to node 111 and to make that connection to node 111.

Consider another example where a number dialed by BRI station set 126 is owned by node 111 but the number is being hosted by node 112. During the TEI assignment procedure, switching node 112 requested permission to host the dialed number from switching node 111, switching node 111 recorded the fact that switching node 112 is now hosting the number. In response to the dialing of the dialed number, switching node 109 (to which BRI station set 126 is connected) examines this number and determines that the number is one which is part of a block owned by switching node 111. This determination is based on information received from switching node 109 in the previous example. Switching node 109 then routes the setup message to switching node 111 via switching node 104. Switching node 111 is responsive to the setup message to examine its own internal table and determine that it has allowed switching node 112 to host the dialed number. Switching node 111 then passes the setup message to switching node 112 which proceeds to alert the dialed station set, such as BRI station set 122, and to send an alerting message to node 109.

After all of the nodes have been operational a short period of time, each node within the system illustrated in FIG. 1 has developed information in its routing tables to enable it to route calls to the various BRI station sets connected to the system in accordance with the principles set forth by the previous examples. In addition, the switching nodes are capable of utilizing new paths through the system when a new PRI or BRI link becomes active. For example, assuming that PRI link 165 was not present during the initialization of the system, node 102 would route calls to node 105 via node 101. When PRI link 165 becomes active switching nodes 102 and 105 exchange node numbers and node 102 notes in its an internal tables that a new path exists to node 105. The next time node 102 routes a call to node 105, switching node 102 will utilize PRI link 165 since there is no intervening node. Similarly, if PRI link 165 fails at some later point of time or is used to its capacity, node 102 once again route calls through node 101 to node 105. This ability to automatically identify new routes and to compensate for routes which have failed, gives the system illustrated in FIG. 1 a high level of reliability.

Software Architecture

Figure 4:
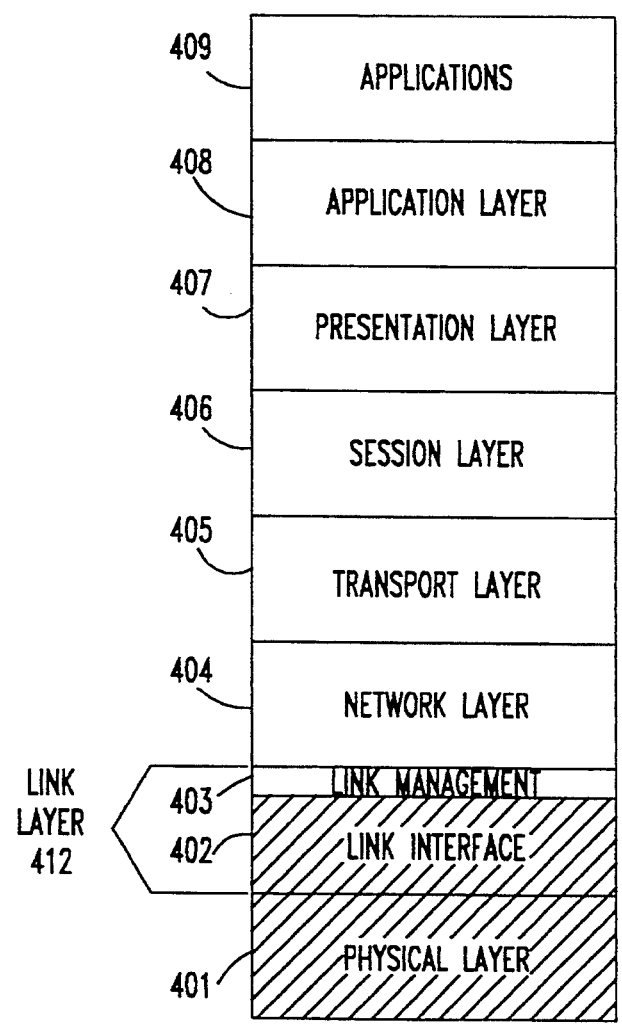
FIG. 4 illustrates a software architecture in accordance with the invention.

FIG. 4 illustrates the software architecture of the switching nodes of FIG. 1. This architecture is based on the conventional OSI model modified to implement the ISDN protocol. In accordance with the invention as described herein, certain further modifications have been made to the standard model in order to include ISDN capabilities.

The principal function of physical layer 401 is to terminate physical links. Specifically, physical layer 401 is responsible for maintaining physical channels and for controlling physical subchannels thereon. Physical layer 401 comprises a software portion and physical interfaces. Further, the software portion of physical layer 401 is responsible for the direct control of the physical interfaces to which physical links communicating PRI and BRI information terminate. Physical layer 401 presents to link layer 412 physical subchannels and physical channels as entities controllable by link layer 412.

The primary function of link layer 412 is to assure that the information transmitted over a physical channel is recovered intact and in the correct order. This is accomplished using another layer of protocol which allows multiple communication paths—commonly referred to as logical links—to be established on a given physical channel or a physical subchannel communicating packetized data. These logical links are used to identify and process data being communicated between link layer 412 and physical layer 401. (An example of this type of protocol is the LAPD packet protocol used in ISDN Q.921. In the ISDN standard, link layer 412 terminates the LAPD protocol.) Link layer 412 can support multiple protocols so that the upper layers are uneffected by the different protocols being utilized. Further, link layer 412 allows higher software layers to control physical layer 401 in an abstract manner.

As seen in FIG. 4, link layer 412 is divided into link interface 402 and link management 403. The reason for this division is set forth herein below. It will be helpful at this point to discuss the communication of ISDN signals over a D channel to help readers, for example, who have only a rudimentary knowledge of the communication of ISDN signals over a D channel. At link layer 412, a plurality of logical links is established on a D channel. Only one of these logical links communicates ISDN control signals, and this logical link is referred to herein as a logical D channel (LDC). The LDC is identified by a logical D channel number (LDCN).

Link interface 402 does the majority of the functions performed by link layer 412, including the establishment of the logical links. Link management 403 identifies the various link interfaces for higher software layers. Further, link management communicates information between the logical links and higher software layers.

Network layer 404 processes information communicated on the LDCs, and thereby terminates the ISDN Q.931 protocol. Hence, this layer is responsible for negotiating the utilization of system resources for the termination or origination of calls external to a switching node. The network layer controls the allocation of channels on an interface on which a call is being received or set up. For example, if switching node 101 receives a call from switching node 102 via PRI link 150, network layer 404 of switching node 101 negotiates with its peer layer (the corresponding network layer 404 in switching node 102) in order to obtain allocation of a B channel in PRI link 150—a procedure later to be repeated if a second B channel is desired. This negotiation is carded out using standard ISDN Q.931 messages such as the call setup and connection messages via the LDC setup on the D channel of PRI link 150. Network layer 404 identifies all B channels of given interface with the LDC for that interface. Network layer 404 is only concerned with the establishment of a call from one point to another point (e.g., switching node to switching node). The network layer is not concerned with how a call is routed internally to a particular switching node but rather transfers information up to higher layers for the determination of how a call is routed in the switching node. However, the network layer does request that one application, referred to here and below as the connection manager application, add or remove facilities on a physical interface to a switch connection within a switching node.

Specifically, the network layer carries out call setup by first determining that the request for the establishment of a call is valid and that the resources between the two switching systems are available to handle this call. After this determination, information concerning the call is transferred to higher software layers. The reverse is true when the network layer receives a request from the higher software layers to establish a connection with another switching node.

Network layer 404 receives information from another node concerning a call via a LDC. As information is received on the LDC, a call reference number is utilized to identify the call associated with this message. The call reference number is selected by the originating network layer during call setup in accordance with the ISDN standard. Details of this identification are given with respect to FIG. 14.

Transport layer 405, is the key element that allows the routing of a call through a complex system having multiple nodes as illustrated in FIG. 1. Its primary function is to manage the routing of calls externally, i.e., between switching nodes. Transport layer 405 views the system of FIG. 1 in terms of nodes and is concerned with routing calls from its own node to other nodes or endpoints. (As explained in the detailed discussion of session layer 406, that layer, not transport layer 405, interprets logical destination information, such as a telephone number, to determine the destination node of a call and to establish an intra-node path by using the connection manager application.) In an overall system comprising multiple switching nodes such as switching node 101, the various transport layers communicate with each other in order to establish a call through the various switching nodes. This communication between transport layers is necessary because it may be necessary to route the call through intervening nodes to reach the destination node. The transport layers communicate among themselves utilizing signaling paths (LDCs) established between switching nodes.

With respect to inter-node routing, transport layer 405 is the first layer that starts to take a global view of the overall system illustrated in FIG. 1. Transport layer 405 uses information provided by session layer 406 to select the inter-node path. The transport layer performs its task of routing between various nodes by the utilization of tables defining the available paths and the options on those paths. These tables do not define all paths but only those paths which the node has already used.

Communication between transport layers is done by network layer 404 using established LDCs. Transport layer 405 communicates information destined for its peers to network layer 404, and network layer 404 packages this information within the information elements, IEs, of standard ISDN Q.931 messages. Network layer 404 uses the LDC that has been setup to a particular node to communicate this information to its peer network layer. Similarly, when another network layer receives information of this type, the other network layer unpackages information and then directs the information to the transport layer.

The primary function of session layer 406 is to establish communication among endpoints with all endpoints considered to be applications including, for example, a BRI station set is considered an application. Significantly, these endpoints may be applications such as the application performing the call processing features or the dialing plan application. In any event, connections between such endpoints is considered a call. A session (call) is set up by session layer 406 any time two applications require communication with each other. As noted earlier, session layer 406 deals only in terms of switching nodes and applications on those switching nodes and relies on transport layer 405 to establish paths to other switching nodes. Session layer 406 identifies the called application by an address which previously in the telecommunication art was thought of as only a telephone number but has a much broader concept in the Q.931 protocol. From this address, session layer 406 determines the destination switching node. Session layer 406 sets up a call to the destination switching node by communicating with the session layer of the destination switching node. The communication with the other session layer is accomplished by having the session layer request its transport layer to place a call to the other switching node so that a connection can be made for a particular address. The transport layer places the call relying on the node number that was determined by the session layer. These requests are done using the network layer to generate standard ISDN Q.931 call setup messages. If the other switching node cannot interpret the address, the session layer of that switching node transmits information to its transport layer requesting that the call be dropped. If the session layer can interpret the address, it sends a message to its transport layer requesting that a call proceeding message be transmitted by its network layer back to the requesting switching node.

Presentation layer 407 of FIG. 4 invokes a complex protocol in order to groom the information being communicated between applications so that the applications are totally divorced from the protocol used to communicate the information. A presentation level protocol allows an application to communicate with a peer application across a transport path.

Finally, application layer 408 manages the resources needed by the applications running at software layer 409. When an application at software layer 409 is communicating with another peer application, the application is unaware of how many other applications exist or where these other applications are located. It is the function of application layer 408 to determine and use such details, consequently allowing the applications to be written in a very abstract manner. At applications layer 409, thus far five applications have been discussed: the system management, dialing plan, terminal management, connection manager, and call processing applications.

Software Architecture Implementation—Overview

Figure 5:
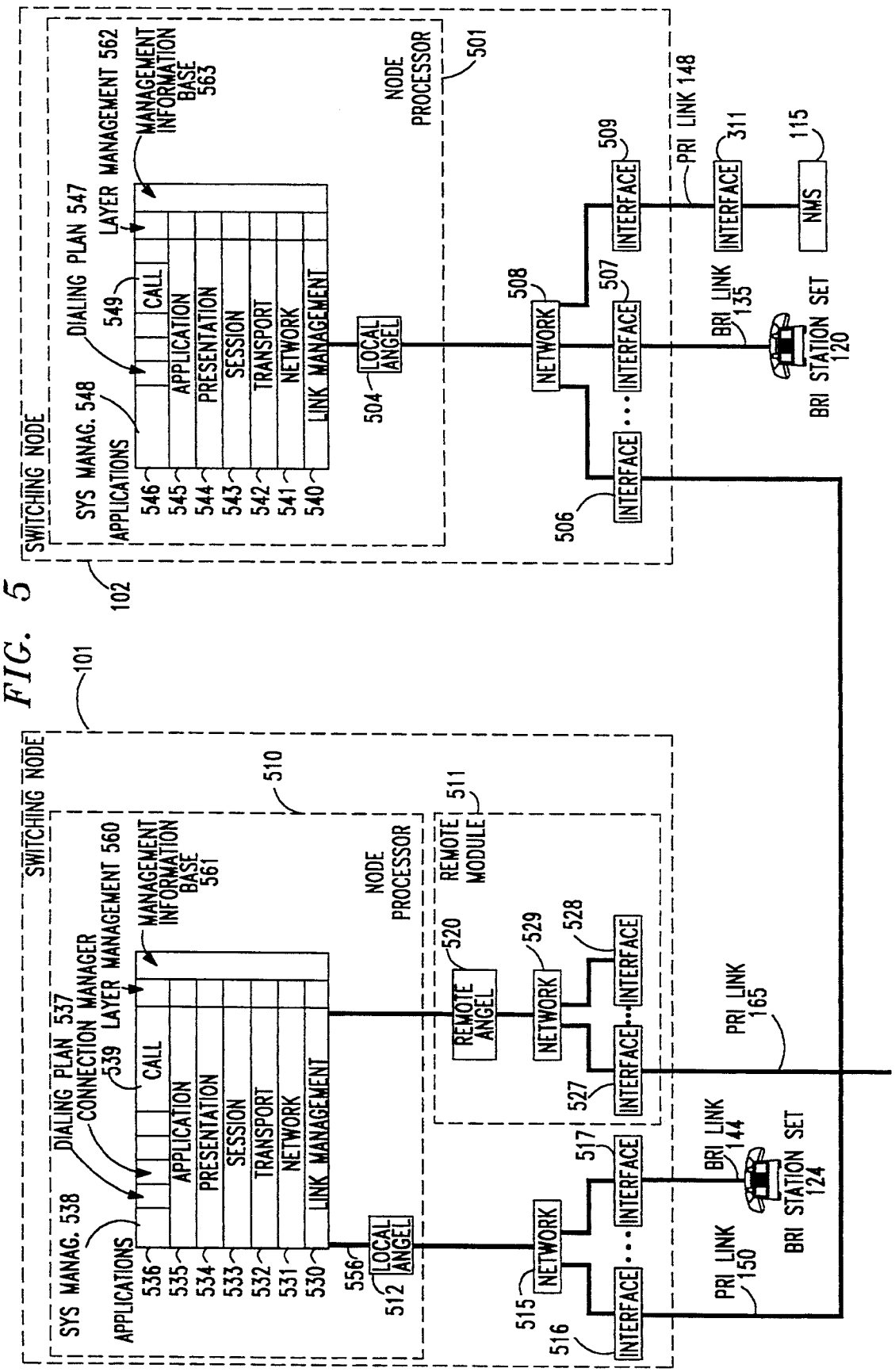
FIG. 5 illustrates, in block diagram form, the relationship between the software architecture and hardware elements illustrated in FIG. 1.

FIG. 5 illustrates in block diagram form the software architecture of FIG. 4 as implemented on switching nodes 101 and 102. Software layers 403 through 409 are implemented on the main processor of each switching node, such as node processor 510 of switching node 101 and node processor 501 of switching node 102. Specifically, the software layers down through the link management portion of the link layer are realized by software layers denoted 536 through 530 in node processor 510 and software layers denoted 546 through 540 in node processor 501.

The link interface portion of the link layer is implemented by a number of separate software modules, each performing a link interface function. Each of these software modules is referred to as an "angel". These angels perform most of the functions of the link layer; and it is the task of the link management portion to simply provide a gateway, or interface, from the various angels to the upper layers of the software structure. The link interface in node 101 is implemented by local angel 512 and remote angel 520. Local angel 512 is a software module executed by node processor 510. Remote angel 520 is a stand alone processor. The operation and purposes of remote angel 520 are described in detail in our U.S. patent application, Ser. No. 07/636,528, of B. M.

Bales, et al. Case 5-1-2-1, filed Dec. 31, 1990, entitled "Transparent Remoting of Switch Network Control over a Standard Interface Link", having the same inventors and assignee as the present application. Correspondingly, the link interface in node 102 comprises local angel 504.

The physical layer is jointly implemented by hardware and software. Specifically, the hardware portion of the physical layer for switching node 101 is implemented by interfaces 516 through 517 and interfaces 527 through 528. The software portion of the physical layer for interfaces 516 through 517 is performed by local angel 512 and for interfaces 527 through 528 by remote angel 520. Interfaces 516 through 517 and 527 through 528 are BRI and/or PRI interfaces of well-known types. Networks 515 and 529 perform the required switching functions under control of local angel 512 and remote processor 520, respectively. At switching node 102, the hardware functionality of the physical layer is carried out interfaces 506 through 509.

A brief description is given of how a standard ISDN link is initialized with respect to the software layers. During the previous discussion of link interface layer 402 and physical layer 401 of FIG. 4, it was described how these two layers function together to establish logical links on packetized ISDN D or B channels. Link management software layer 403 identifies these logical links and communicates information to or from one of the logical links with any designated higher software layer. The destination of the higher software layer occurs when the logical link is initialized. For example on a D channel of a standard ISDN link, one specific logical link (referred to as a logical D channel, LDC) is always communicated to network software layer 404 in accordance with the ISDN specification. The LDC communicates all call control information for the B channels of the standard ISDN link and is an integral part of the ISDN specification.

Consider the initialization of a standard ISDN link. When a standard ISDN link becomes active, the physical layer identifies the physical interface number of that link to the link interface software layer. The link interface software layer uses the packet protocol on the D channel to identify what is on the other side of the interface by communicating over a pre-specified logical link of the D channel. The link interface software layer then informs the link management software layer that a new interface is active, that it has a certain number of B channels, and identifies to what the new interface is connected (if possible). The link management software layer informs the network software layer that a new interface is active and that it contains a certain number of B channels.

In response, the network software layer records the new interface's existence and sets up tables to control the B channels. If call control signaling has not previously been established with the other side over a different interface, the network software layer assigns an LDC record to the interface and requests that the link management layer establish a signaling logical link with the other side. This request is passed to the link interface layer which uses the LAP-D protocol to establish signaling. When the signaling logical link is established, the link interface layer notifies the link management layer which notifies the network software layer that call signaling is active. Finally, the network software layer informs the transport software layer that a new LDC is active and to what system entity the new LDC is connected.

After both sets of software layers (e.g. software layers 530 through 536 and software layers 540 through 546) are initialized in this manner, calls may be established over the B channels associated with the LDC by the network software layers. Signaling information received or transmitted on the LDC is communicated between the network software layer and the link management software layer. In turn, the link management software layer communicates this information with link interface software layer for communication on the logical link of the D channel. For example, PRI links 150 and 148 are established in this manner.

Network Management Initialization

NMS 115 has a similar software structure as software layers 540 through 546; however, the applications of NMS 115 are different than those in software layer 546. Once the LDC becomes active on PRI link 148, NMS 115 utilizes the system identification information received from switching node 102 to determine that NMS 115 is connected to switching node 102. Then, the system network manager application running in NMS 115 places a call to the system management application 548 running at software layer 546 in node processor 501. The call is directed to system management application 548 by utilizing the node number of switching node 102 and the specific telephone number which all system management applications share. Once the call is established between the system management application 548 and the system network manager application in NMS 115, the system network manager application requests that the system management application 548 transfer to it from the management information base 563 information relating to physical interfaces connected to switching node 102 (such as interface 506), switching nodes to which switching node 102 is connected (such as switching node 101) and the connected terminals (such as BRI station set 120). The system network manager application in NMS 115 stores this information in the appropriate tables and analyzes it to determine the switching nodes which are interconnected to switching node 102. The routing tables of switching node 102 are illustrated in FIG. 6, which was populated during the initialization of switching node 102.

As illustrated in FIG. 5, switching node 101 is interconnected to switching node 102 via PRI link 150. NMS 115 places a call via switching node 102 and PRI link 150 to system manager application 538 in switching node 101. The signaling information required to establish such a call through switching node 102 is transmitted over the LDC established on the D channel of PRI link 148. These signals are commonly called a setup message. The setup message is then processed by local angel 504, link management 540, and network layer 541 to present this setup message to transport layer 542. Transport software layer 542 analyzes the node number utilizing routing table 602 illustrated in FIG. 6. Transport software layer 542 determines that there exists an LDC to switching node 101 and requests that network software layer 541 transmit the setup message to switching node 101. Network software layer 541 then requests that link management software layer 540 transmit the setup message on the established LDC for switching node 101. The message is then handled by the local angel 504 and transmitted to switching node 101 via the LDC established on the D channel of PRI link 150. When the setup message arrives at transport software layer 532 after being processed by the lower software layers, software layer 532 recognizes the node number as its own and utilizes the telephone number in the setup message to establish a session between system application 538 and system network manager application in NMS 115. The session is established by transport software layer 532 requesting that a connection message be transmitted by network software layer 531 back to the network software layer 541 of switching node 102. The session being established is a logical call and only requires that information be switched over LDCs. It is not necessary for the local angels to request that networks 508 and 515 switch B channels. Once the session has been established between the system network management application of NMS 115 and system management application 538, the system network manager application requests that system management application 538 transfer to it from management information base 561 similar information to that which was requested from system management application 548. The routing tables for switching node 101 are illustrated in FIG. 6. The system network manager application in NMS 115 performs similar functions with respect to switching nodes 103 through 112.

Dialing Plan Initialization

After the system network manager application has set up a session with each switching node, the dialing plan management application in NMS 115 requests that a session be set up to the dialing plan application of that switching node. For example, the dialing plan management application requests that a session be set up to dialing plan application 547 in switching node 102. When the session has been set up, the dialing plan management application gives to switching node 102 ownership of all telephone numbers of the system illustrated in FIG. 1. The dialing plan table for switching node 102 is illustrated as table 708 in FIG. 7 which also illustrates the changes in the routing tables of switching node 102.

The numbers in the ownership column of tables 708 and 711 of FIG. 7 have the following meaning: "1" means that a number block is owned by the node and received from the node listed in the node column, and "2" means that a number block has been given away to the node listed in the node column. A number block comprises a hundred numbers. The status column maintains the status of a permission request and whether a call still exists between two dialing plan applications. A "1" means permission granted, a "2" means permission requested, and a "3" means that a call still exists between the two dialing pan applications.

Next, the dialing plan management application sets up a session to the dialing plan application 537 of switching node 101 and informs dialing plan application 537 that it is to own numbers 1000 to 1999 (IXXX block). No changes are made in the routing tables of switching node 101 until switching node 101 has received permission from switching node 102 to own this number block. In addition, the dialing plan management application informs dialing plan application 537 that the dialing plan application 547 on switching node 102 is higher in dialing plan hierarchy than switching node 101. The dialing plan management application in NMS 115 distributes the dialing plan to nodes 103 through 112 by use of sessions in a similar manner. These sessions are set up by utilizing a setup message which is directed to the appropriate dialing plan application by use of the node number and a predefined telephone number which is common for all dialing plan applications.

A dialing plan application (such as dialing plan application 537 of switching node 101) cannot actually own a block of numbers until it has received permission to do so from the dialing plan application which owns the block. First, the two dialing plan applications must setup a session between themselves. For example, dialing plan application 537 requests that transport software layer 532 set up a call to dialing plan application 547. Transport software layer 532 accesses the node number (102) from the level 4 routing table for node 101 illustrated in FIG. 6. The node number defines that link 150 is to be used for the call. This table is stored in management information base 561. Transport software layer 532 in conjunction with the lower software layers sets up a session with dialing plan application 547 in switching node 102. Once this call is set up, dialing plan application 537 requests permission from dialing plan application 547 to own the blocks of numbers which were supplied to dialing plan application 537 by dialing plan management application in NMS 115. Referring to FIG. 7, entry 704 of dialing plan table 711 for switching node 101 initially has a "2" in the status column while dialing plan application 537 is requesting permission and then a "1" when permission is received from dialing plan application 547 to own the "1XXX" block of numbers. Similarly, entry 705 in dialing plan table 708 is only present after dialing plan application 547 has given dialing plan application 537 permission to own the "1XXX" block of numbers. In addition, entry 702 of the level 5 routing table 706 of switching node 102 illustrates the change made as a result of the actions of switching node 101. These changes indicate that switching node 101 now owns the "1XXX" blocks of numbers and that calls for numbers within this block should be routed to switching node 101. Level 5 routing table 709 for switching node 101 has two entries made as a result of switching node 101 requesting permission to own the "1XXX" block of numbers. The dialing plan applications of switching nodes 103 through 112 establish similar calls with the switching node which is higher in the hierarchy than they are and also obtain permission to own their destinated block of numbers. For similar operations, FIG. 9 shows the results for the dialing plan tables and routing tables of switching nodes 101, 104, 109, and 111.

Call Routing

Figure 8:
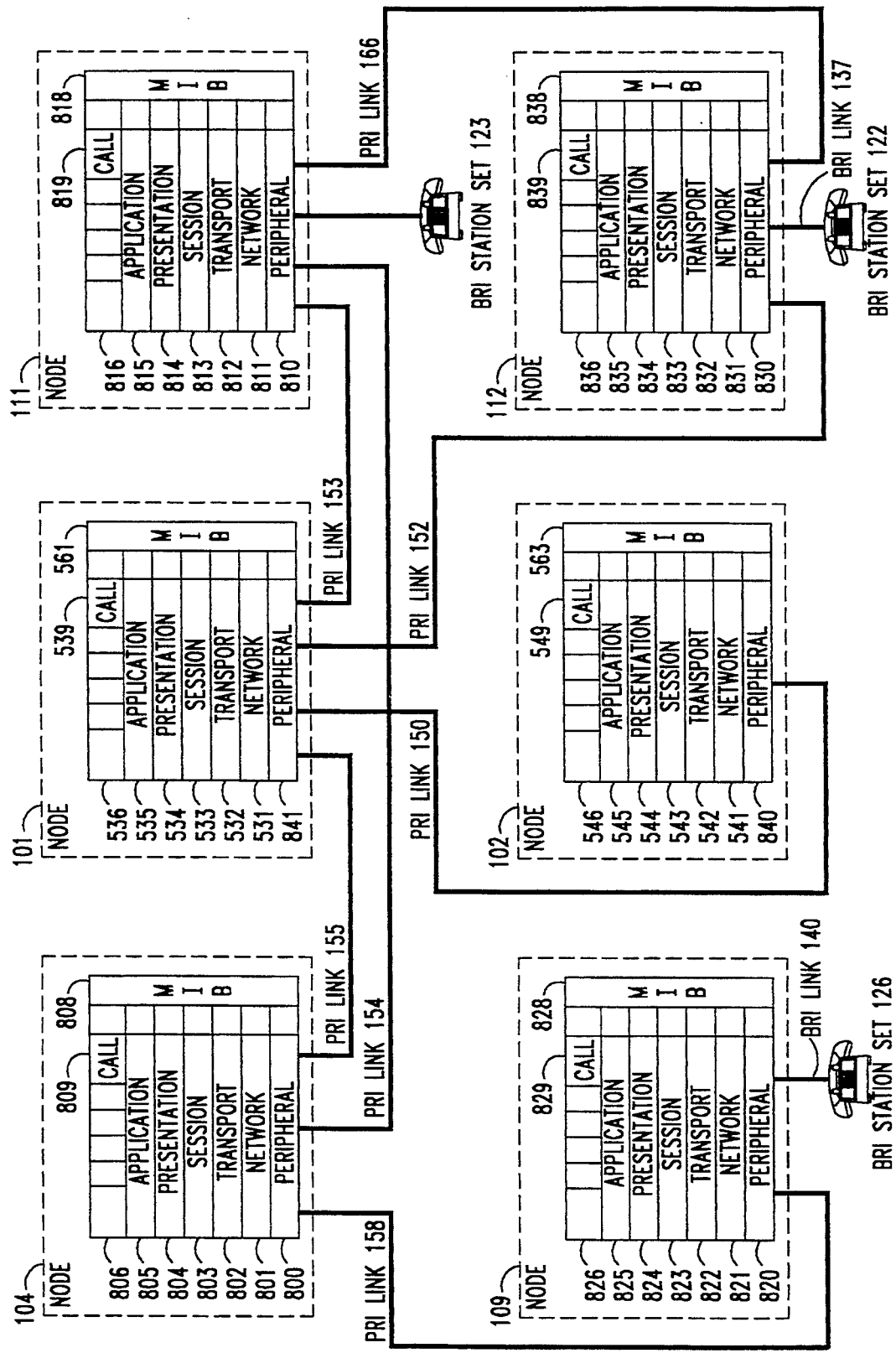
FIG. 8 illustrates, in block diagram form, the relationship between the software architecture and hardware elements for six switching nodes as illustrated in FIG. 1.

FIG. 8 illustrates from a software view point the software layers of switching nodes 101,102, 104, 109, 111, and 112. The switching nodes, as illustrated in FIG. 8, are shown as having the link management software layer, angels, networks, and interfaces combined into the unit called a peripheral. For example, peripheral 840 of switching node 102 includes local angel 504, network 508, interfaces 506, 507, and 509 of FIG. 5. To understand how call routing is done in a first embodiment, consider now in greater detail the example of routing calls between BRI station set 126 connected to switching node 109 and BRI station set 123 connected to switching node 111 as illustrated in FIG. 8. As signaling information defining the called telephone number (also referred to as the dialed number) is received by switching node 109 from B RI station set 126 via the D channel of BRI link 140, that information is communicated to the call application 829. The dialed number is "1201". The call processing application 829 requests that session software layer 823 establish a call on the basis of the dialed number. Session software layer accesses level 5 routing table 916 of node 109 illustrated in FIG. 9 and determines that it does not know how to route the call. (All tables are searched from top to bottom.) As a default action, the session software layer decides to route the call to the switching node that has the dialing plan manager for the number "nearest" the dialed number, in this case, switching node 104. Session software layer 823 then transmits down to transport software layer 822 a request to route a setup message to switching node 104.

Transport software layer 822 is responsive to this request to access level 4 routing table 917 illustrated in FIG. 9 and to determine from entry 904 that the LDC of PRI link 158 is to be used to access switching node 104. Transport software layer 822 then sends a request to network software layer 821 to transmit a setup message to switching node 104 with the dialed telephone number. Network software layer 821 in conjunction with peripheral 820 transmits the setup message via PRI link 158 to switching node 104.

When the setup message is received by peripheral 800, it is transferred to transport software layer 802 via network software layer 801. Transport software layer 802 recognizes the node number for switching node 104 and transfers the setup message to session software layer 803. Session software layer 803 accesses level 5 routing table 911 of switching node 104 as illustrated in FIG. 9 to match the dialed number with one of the telephone numbers entered in the table. The only telephone number that matches the dialed number is entry 903 which identifies switching node 102. Session software layer 803 then requests that transport software layer 802 transmit the setup message to switching node 102 and include the telephone number.

Transport software layer 802 accesses level 4 routing table 912 of switching node 104 to find a path to switching node 102. Transport software layer 802 matches at entry 908 of FIG. 9 and determines that the route to switching node 102 is via PRI link 155. The latter software layer then formulates a request to network software layer 801 to transmit the setup message to switching node 102 and includes the dialed number in this message. Network software layer 801 transmits the setup message via PRI link 155 to switching node 101.

When the setup message is received by transport layer 532 via peripheral 841 and network software layer 531, this transport layer accesses level 4 routing table 914 for switching node 101 as illustrated in FIG. 9. The transport software layer finds a match for switching node 102 in entry 907. Based on this match, transport layer 532 makes a request to network software layer 531 to transmit the setup message to switching node 102 utilizing PRI link 150. Network software layer 531 is responsive to this message to transmit the setup message to switching node 102 via PRI link 150.

When transport software layer 542 of switching node 102 receives the setup message, it examines the destination switching node number and determines that it is its own. Transport software layer 542 then communicates the setup message to session layer 543. Session layer 543 interrogates level 5 routing table 706 for switching node 102 illustrated in FIG. 7 and determines that the dialed number is part of a block of numbers designated entry 702 to which ownership had been given switching node 101. As a result, session software layer 543 communicates to transport software layer 542 a request to route the setup message to switching node 101. Transport software layer 542 is responsive to this request and the fact that the setup message was received from switching node 101, to communicate a redirect message to network software layer 541 indicating that the destination switching node had been changed to that switching node 101. The redirect message is sent back to switching node 101.

When the redirect message is received by transport software layer 532 of switching node 101, this software layer communicates the redirection indication to session software layer 533. The latter software layer is responsive to the dialed number to access level 5 routing table 913 for switching node 101 illustrated in FIG. 9. The dialed number (1201) matches entry 905 of FIG. 9. This entry designates that this number can be found on switching node 111. As a result, session software layer 533 transmits a request to transport layer 532 to route the setup message to switching node 111. The latter software layer is responsive to the request to access level 4 routing tables 914 for switching node 111 as illustrated in FIG. 9 and to determine that switching node 111 can be reached via PRI link 153 as indicated by entry 906. Transport software layer 532 then communicates a request to network software layer 531 to transmit the setup message to switching node 111 via PRI link 153. Upon receiving the setup message via peripheral 840, software layer 811 and transport software layer 812, session software layer 813 of switching node 111 determines that the dialed number references BRI station set 123. The latter software layer then transmits a request to the transport software layer 812 for the setup message to be communicated to BRI station set 123. Upon receiving the setup request, BRI station set 123 responds with a alerting message.

Before transmitting the alerting message back to switching node 101, transport software layer 812 accesses the ownership of number blocks owned by switching node 111 (number block 12XX) from management information base 818 and includes this information in the alerting message. The alerting message is transferred to switching node 101 and is routed to transport software layer 532. The latter software layer also inserts ownership information for blocks of numbers owned by switching node 101 before routing the alerting message to switching node 104. Transport software layer 802 is also responsive to the alerting message to insert ownership information for blocks of numbers owned by switching node 104. In addition, the transport software layer 802 stores the blocks of numbers owned by switching nodes 101 and 111 in its level 5 routing table. Transport software layer 802 then transfers the alerting message to switching node 109. Transport software layer 822 is responsive to the alerting message to route it to BRI station set 126. In addition, transport software layer 822 stores the ownership information for blocks of numbers owned by switching node 104, 101, and 111. The result of the updating of the routing tables in this manner is illustrated in FIG. 10.

To illustrate how the updated routing tables are utilized, consider that BRI station set 126 once again places a call to BRI station set 123. After the number has been dialed on BRI station set 126, this number is transferred to session software layer 823 via call processing application 829. Session software layer 823 is responsive to the dialed number to examine level 5 routing table 1007 for switching node 109 as illustrated in FIG. 10. A match is found for the dialed number in entry 1001 which designates that the call should be routed to switching node 111. Session software layer 823 then requests that transport software layer 822 send a setup message to switching node 111.

Transport software layer 822 is responsive to this request to examine level 4 routing table 1008 for switching node 109 as illustrated in FIG. 10. A match is found for switching node 111 in entry 1002. Entry 1002 indicates that the setup message is to be routed to switching node 111 via PRI link 158. Transport software layer 822 requests that a setup message be sent to switching node 111 on link 158 including the dialed number, and this request is communicated to network software layer 821. Network software layer 821 in conjunction with peripheral 820 then transmits the setup message to switching node 104 via PRI link 158.

When the setup message is received by transport software layer 802 of switching node 104, the latter software layer interrogates level 4 routing table 1006 for switching node 104 as illustrated in FIG. 10. Entry 1003 matches the destination switching node and indicates that the setup message is to be transmitted on PRI link 154. Transport software layer 802 requests that network software layer 801 transmit the setup message to switching node 111 via PRI link 154. Upon receiving the setup message, switching node 111 transfers the setup message to BRI station set 123 and performs the previously described functions with respect to the alerting message which is received back from BRI station set 123.

To further understand the routing of calls, consider the example where BRI station set 122 which is interconnected to switching node 112 via BRI link 137 requested during initialization to be given the number "1205". Since switching node 111 was given ownership of all "12XX" numbers, switching node 112 requested permission to host the number "1205". After giving permission to switching node 112 to host that number, switching node 111 updated its dial plan and routing tables as illustrated in FIG. 11, and switching node 112 also updated its dialing plan and routing tables as illustrated in FIG. 11.

Referring back to FIG. 8, when BRI station set 126 dials the number "1205", switching node 109 in conjunction with switching node 104 routes a setup message designating switching node 111 to switching node 111 in the same manner as previously described. When the setup message is received by switching node 111, transport software layer 812 communicates the message to session software layer 813. The latter software layer is responsive to the dialed number to access level 5 routing table 1104 shown for switching node 111 in FIG. 11. Entry 1101 matches the dialed number, and session software layer 813 requests that the setup message be communicated to switching node 112.

Transport software layer 812 is responsive to the request from layer 813 to interrogate level 4 routing tables 1105 for switching node 111 and to determine that PRI link 166 is to be utilized for communicating the setup message.

When the setup message is received by session software layer 833 of switching node 112, that software layer interrogates level 5 routing table 1102 illustrated in FIG. 11, and determines that the BRI station set being dialed is attached to switching node 112. Software layers 830 through 833 then cooperate to transmit the setup message to BRI station set 122. The station set responds with an alerting message which is processed by the various software layers in switching nodes 112, 111,104, and. 109 to update the routing tables in the manner previously described. The results of this processing of the alerting message is illustrated in the routing tables for switching node 104, 109, and 111 as illustrated in FIG. 12. The routing tables of switching node 112 are identical to those shown in FIG. 11.

FIG. 12 illustrates how rapidly a switching node learns to route calls on the basis of the dialed telephone number and accumulates information for routing to specific switching nodes. The ability to learn new routes is important. A very good example of this ability was switching node 104 taking advantage of the connection of PRI link 154 to switching node 111 rather than following the initial route which was through switching node 101. If the capacity of PRI link 154 becomes totally utilized or this link becomes unoperational, then calls would once again be routed to switching node 111 from switching node 104 via switching node 101. If a new link is added to the system such as PRI link 165 between switching nodes 102 and 105, the system quickly learns to utilize this newly added link.

Consider now a second embodiment for doing call routing. Call routing in accordance with the first embodiment was described with respect to FIGS. 9 through 12. In the first embodiment, each switching node receiving an alerting message inserted into that alerting message ownership information for blocks of numbers owned by the receiving switching node and accessed from the alerting message ownership information for blocks of numbers owned by other switching nodes between the receiving switching node and the destination switching node in the call path. The first embodiment allows the level 5 routing tables to accumulate information regarding ownership of blocks of numbers at a very rapid rate. However, it greatly adds to the length of the alerting messages and to the time required to process each of these alerting messages. In the second embodiment, only the destination switching node inserts ownership information for the blocks of numbers owned by the destination switching node, and the intermediate switching nodes neither add nor extract ownership information as they process the alerting message back to the originating switching node. The originating switching node does update its level 5 routing table with the ownership information from the destination switching node.

To understand how call routing is done in the second embodiment, consider the example of routing calls for the first time between BRI station set 126 connected to switching node 109 and BRI station set 123 connected to switching node 111 as illustrated in FIG. 8. The setup message is processed as was previously described for the first embodiment resulting in a call path between switching node 109 and switching node 111 being set up through switching nodes 104 and 101. When switching node 111 forms the alerting message, switching node 111 inserts into the alerting message its ownership information as illustrated in dialing plan table 918 of FIG. 9. The alerting message is then processed through switching nodes 101 and 104 without these switching nodes performing any operations with respect to ownership information. When the alerting message is received by switching node 109, that switching node updates its level 5 routing table. The result of this updating is illustrated in level 5 routing table 1007 of FIG. 10 by entry 1001. The difference between the first embodiment and the second embodiment is that level 5 routing table 1005 of node 104 as illustrated in FIG. 10 would have the first entry deleted so that it was equivalent to level 5 routing table 911 of FIG. 9 for node 104.

To illustrate how the updated routing table would be utilized in the second embodiment, consider that BRI station set 126 once again places a call to BRI station set 123. After the number has been dialed on BRI station set 126, this number is transferred to session software layer 823 via call processing application 829. Session software layer 823 is responsive to the dialed number to examine level 5 routing table 1007 for switching node 109 as illustrated in FIG. 10. A match is found for the dialed number in entry 1001 which designates that the call should be routed to switching node 111. Session software layer 823 then requests that transport software layer 822 send a setup message to switching node 111. Transport software layer 822 is responsive to this request to examine level 4 routing table 1008 for switching node 109 as illustrated in FIG. 10. A match is found for switching node 111 in entry 1002. Entry 1002 indicates that the setup message is to be routed switching node 111 via PRI link 158. Transport software layer in conjunction with lower layers then transmits a setup message to switching node 104 via PRI link 158.

When the setup message is received by transport software layer 802 of switching node 104, the latter software layer interrogates level 4 routing table 1006 for switching node 104 as illustrated in FIG. 10. Entry 1003 matches the destination switching node number and indicates that the setup message is to be transmitted on PRI link 154. Transport software layer 802 requests that network software layer 804 transmit the setup message to switching node 111 via PRI link 154. Upon receiving the setup message, switching node 111 transfers the setup message to BRI station set 123. This example illustrates that by utilizing the second embodiment for call routing that the switching nodes also perform adaptive call routing.

In a third embodiment, a predefined number of switching nodes along the path from the originating node insert and access ownership information from the alerting message. This enables switching nodes to learn very rapidly ownership information about switching nodes closely connected to themselves. A fourth embodiment is where a predefined number of switching nodes in the call path from the destination switching node insert and access ownership information from the alerting message. The alerting message contains a sequential list of the switching nodes that make up the call path, and the third and fourth embodiments make use of this fact. In a fifth embodiment, a predefined number of switching nodes from the destination node and a predefined number of switching nodes from the originating node insert and access ownership information from the alerting message. The fifth embodiment allows switching nodes to learn very rapidly about the distribution of numbers local to themselves and at distant points but not about the distribution of numbers in intermediate switching nodes.

Node Hierarchy Identification

The node hierarchy is illustrated in FIG. 2, and the node numbers associated with each of the switching nodes is illustrated in FIG. 13. As the system is being brought up, each switching node must establish its position in the switching node hierarchy. The node number as illustrated in FIG. 13 consists of a network number which defines the network to which the switching node belongs and a node identification field which defines the switching node's hierarchical position within that network. The fields of the node number are separated by ".". As previously described, when switching node 102 is initializing, it exchanges node numbers with switching node 101. Upon receiving the node number for switching node 101 as illustrated in line 1301, switching node 102 can immediately determine that switching node 101 is its superior in the node hierarchy since the node identification field for switching node 102 as illustrated in line 1302 defers only by a zero in the most significant position. To consider an example where a node is not directly connected to the switching node which is higher than itself in the node hierarchy, assume that in FIG. 1 that PRI link 151 is not present interconnecting switching nodes 105 and 101. As switching node 105 initializes, it is only interconnected to switching node 102 and 112. By examination of the node identification fields illustrated in lines 1302, 1303, and 1304, switching node 105 can determine that switching nodes 102 and 112 are at the same level in the node hierarchy as itself (as is illustrated in FIG. 2). However, switching node 105 through internal programming only needs to change the least significant field of the node identification area to a zero to obtain the switching node number of switching node 101. After determining the switching node number of switching node 101, switching node 105 establishes a call to switching node 101 via either switching node 102 or switching node 112 as illustrated in FIG. 1. In this manner, switching node 105 determines a path to the node which is higher in the node hierarchy than itself. Therefore, it can be seen from FIG. 13 that the node number provides enough information for a switching node to determine the node number of the switching node higher in the node hierarchy than itself. Once a switching node has the node number of the node higher in the switching node than itself, it can establish the path to the higher hierarchical switching node by attempting to set up a call to that switching node.

Initialization and Identification of Interfaces

Figure 14:
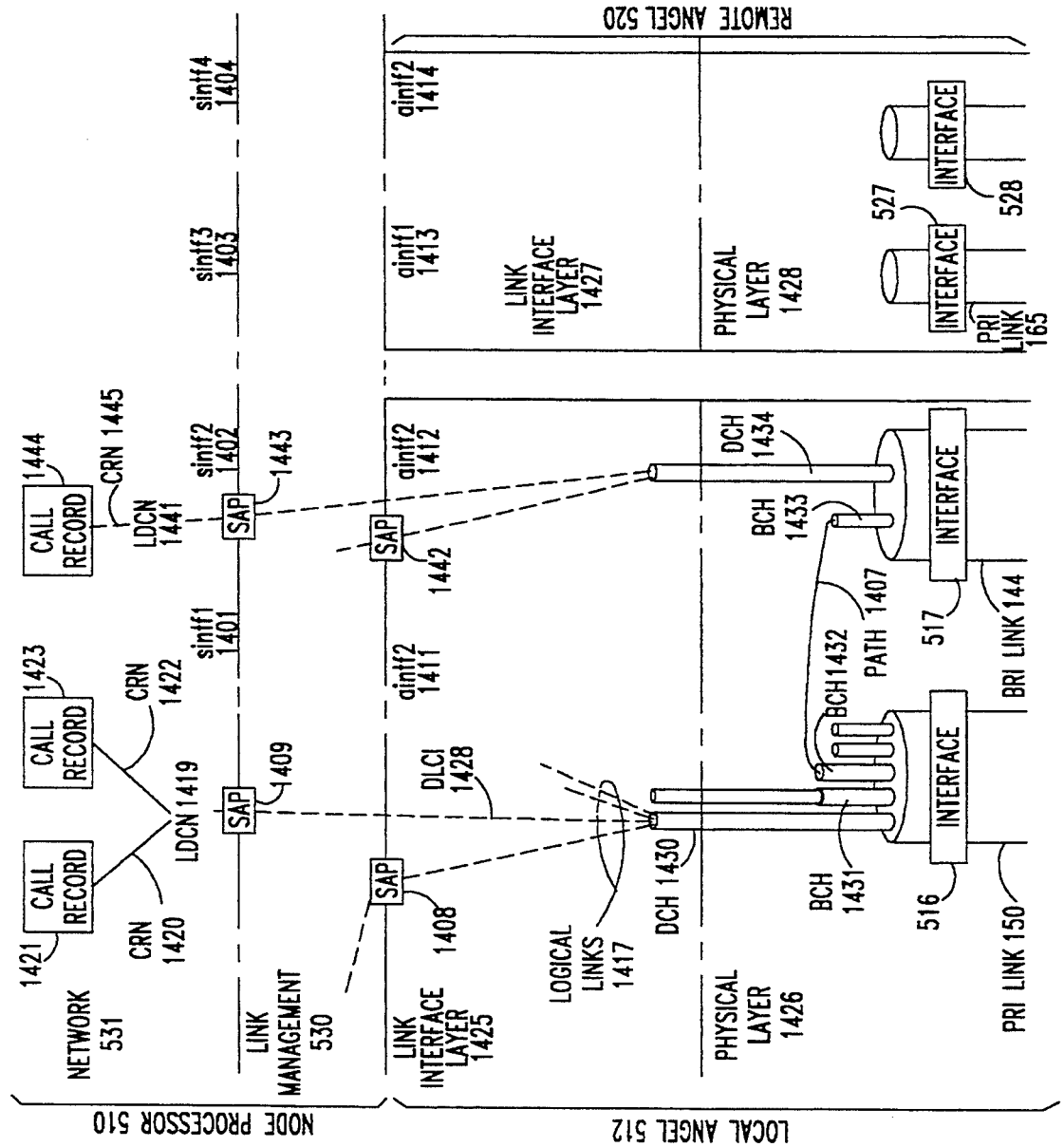
FIG. 14 logically illustrates the signaling and transport paths that are set up within a switching node.

FIG. 14 logically illustrates the general relationships between data link connection identifiers (DLCI), service access point identifiers (SAPI), terminal end identifiers (TEI), system interface numbers (sintf), switches angel interface numbers (aintf), logical D channel numbers (LDCN), call reference numbers (CRN), and the various software layers. As illustrated in FIG. 14, each pair of link interface layers and physical layers is implemented on a different angels. Link interface layer 1425 and physical layer 1426 are implemented by local angel 512, and link interface layer 1427 and physical layer 1428 are implemented by remote angel 520. Node processor 510 implements link management 530, network 531, and higher layers. Sintf, switch and aintf numbers correlate to physical interfaces. The sintf numbers are utilized by network software layer 531 and higher software layers to identify physical interfaces. Network layer 531 views the physical interfaces as being identified by sintf1 1401 through sintf4 1404. Link management 530 makes a conversion between the sintf numbers and the switch and aintf numbers which together represent the physical interface. For example, link management 530 converts sintf1 1401 to local angel 512 and aintf1 1411. Link interface layer 1425 utilizes aintf1 1411 to identify physical interface 516. There is a one for one correspondence between sintf1 1401 through sintf6 1404 and aintf1 1411 through aintf2 1414.

The sintf and aintf numbers identify specific interfaces, and each interface has a number of channels. For example, PRI link 150 has 24 channels, and BRI interface 517 has three channels. Network layer 531 identifies the channels associated with a particular sintf by using the actual physical channel numbers, and similarly, link interface layer 1425 utilizes the physical channel numbers in association with an aintf number. This is possible because the specifications of the ISDN standard designate that physical channel 24 is used to perform signaling. Network layer 531 and higher layers utilize sintf numbers in order to control the link interface layers and physical layers to interconnect physical channels and to create specific protocols on these channels. The manner in which B channels are interconnected through physical networks such as network 515 is not illustrated in FIG. 14 except in a logical manner, e.g. path 1407.

Further, FIG. 14 logically illustrates the utilization of the various channels and the points at which these channels are terminated and at which information is utilized. B channel 1432 of interface 516 is interconnected to B channel 1433 of interface 517 by path 1407. Path 1407 is made through network 515 which is not shown in FIG. 14 but is shown in FIG. 5. It would be obvious to one skilled in the art that similar paths could be made between B channels in interface 516 and 517. The circuit switching of B channels is performed at the physical layer; whereas, packet switching or frame relaying is performed at the link interface layer.

Figure 15:
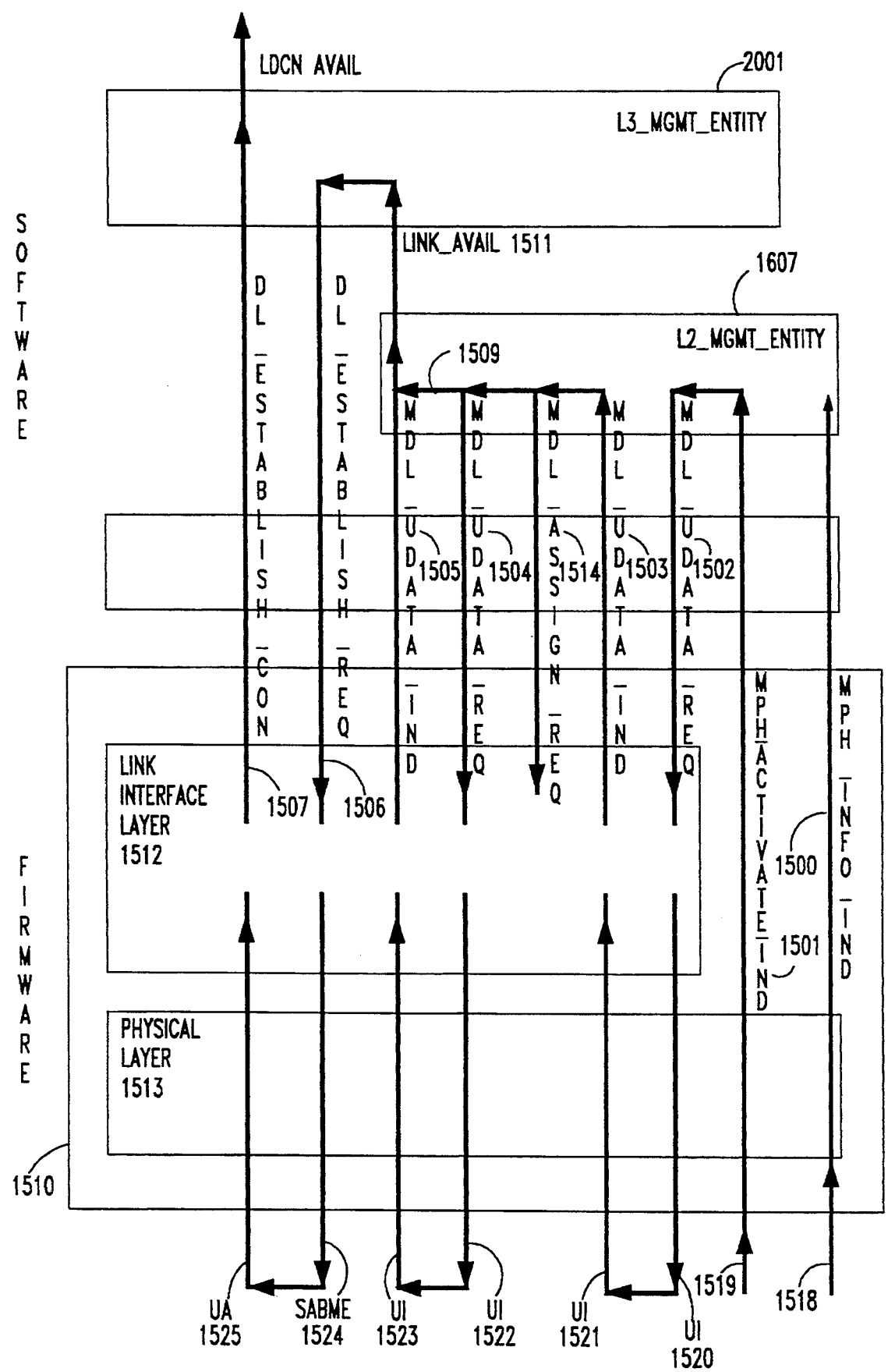
FIG. 15 illustrates a software architecture for a link interface.

The manner in which a LDC is set up is described in greater detail with respect to FIG. 15 and is not repeated at this point. However, FIG. 14 illustrates the manner in which D channel 1430 is subdivided so as to provide the necessary flow of information to implement a LDC. At physical layer 1426, all channels are treated alike. First, link interface layer 1425 under control of higher layers establishes a LAPD packet protocol on D channel 1430 which is channel 24 of PRI link 150. The LAPD packet protocol creates a plurality of logical links 1417 each of which is identified by a DLCI number such as DLCI 1428. A DLCI number is based on the TEI and SAPI numbers with each pair of TEI and SAPI numbers designating one DLCI or logical link. The protocol allows for a 128 TEI numbers and 63 SAP numbers. D channel 1434 is subdivided in the same manner as D channel 1430.

In accordance with the ISDN specification, a physical link can be considered either as point-to-point or point-to-multi-point. By convention, a PRI link may only be point-to-point resulting in only one TEI number being allowed on the D channel of a PRI link. Further by convention, that TEI number is equal to 0. A BRI link may be point-to-point or point-to-multi-point resulting in a D channel of BRI potentially having more than one TEI number. In accordance with the ISDN specification, four of the SAPI numbers of a D channel are predefined as 0 for call control, 16 for implementing a X.25 protocol, 1 for a packet mode connection, and 63 for peer to peer communication between link management layers. In FIG. 14, SAP 1408 has the value of 63 and is used by link management 530 for communication with its peer in the present example on switching node 102. SAP 1409 has a value of 0 and is used to implement LDCN 1419. In the present example, the SAPs having values of 16 and 17 are not implemented. The remainder of the 60 SAP values may be utilized to establish packet connections for the communication of data for software layers above network software layer 531. SAPs 1442 and 1443 correspond to SAPs 1408 and 1409 in function.

All signaling is controlled via LDCN 1419 for interface 516. Upon receiving a SAPI of 0 which is SAP 1409, link management 530 directs this to network software layer 531. In accordance with the ISDN specification, call reference numbers are included in the Q.931 protocol and are received via LDCN 1419. These call references numbers are utilized to identify call records such as call record 1421 or 1423. For example, CRN 1420 and 1422 identify call record 1421 and 1423, respectfully. There is one call record for each channel or channel that is engaged in a circuit switched or packetized call on a physical interface. A call record is established for setup message when that message is first received. Link management 530 utilizes sintf1 1401 to associate LDCN 1419 with call records 1421 and 1423. At network software layer 531, CRN numbers are only unique with respect to an individual LDCN. CRN 1445 and call record 1444 are similarly associated with LDCN 1441.

FIG. 15 illustrates the messages that are exchanged in bringing up an interface on switching node 101 of FIG. 5. A physical interface, firmware 1510, which includes link interface layer 1512 and physical layer 1513, is physically being implemented on either local angel 512 or remote angel processor 520. First, consider FIG. 15 from the point of view of physical interface 516 of FIG. 5 which is being bought up. Initially as an interface is plugged in (path 1518), physical layer transmits the mph_info_ind 1500 primitive which is directed to L2_MGMT_ENTITY 1607 (a level 2 management entity which is described in detail with respect to FIG. 16). Note, the service access point (SAP) number is a 63 for a MDL primitive and a zero for a DL primitive. Primitive 1500 also includes the aintf which the angel selects. The aintf is the reference used by L2_MGMT_ENTITY 1607 to refer to that interface. Primitive 1500 also defines the type of interface, such as a PRI, BRI or FRI link, that has been brought up. Note, that the mnemonics indicate where the message is from and where it is going. MPH means that the message is between the physical layer and the level 2 management entity, MDL indicates that message is between the level 2 management entity and the LAPD portion of link interface layer 1512, and DL indicates that message is between level 5 and the LAPD portion of link interface layer 1512.

When physical layer 1513 detects framing (path 1519) on the interface, physical layer 1513 communicates this fact to entity 1607 by the transmission of MPH_ACTIVATE_IND 1501 primitive. To completely respond to primitive 1501, entity 1607 needs to establish with the other interface the terminal endpoint identifier (TEI). The TEI is determined through negotiations with the other interface. To accomplish this negotiation, entity 1607 communicates with its peer level 2 management that is controlling the other interface. For example, assume that the indication on path 1519 resulted from a BRI interface becoming active by a telephone being plugged into the BRI interface. Most BRI telephones are programmed to negotiate the TEI specified by the ISDN standard in response to Q.921 messages received via the BRI interface. If the active interface is not a BRI interface which supports the automatic TEI procedures, primitives 1502 and 1503 are not exchanged. Entity 1607 starts the TEI negotiation by sending the MDL_UDATA_REQ 1502 primitive that contains a TEI selected by entity 1607 to layer 1512. In response, layer 1512 transmits UI 1520 (unumbered frame). The peer entity responds to UI 1520 via its interface with UI 1521 that contains an indication of the peer entity's agreement with TEI selected by entity 1607. In response to UI 1521, link interface layer 1512 inserts the indication into MDL_UDATA_IND 1503 primitive. The CCITT ISDN specification allows for other commands at this point that allow for further negotiation of the TEI if entity 1607 selected a TEI that was already being used by the telephone.

Entity 1607 responds to primitive 1503 by transmitting MDL_ASSIGN_REQ 1514 primitive to link interface layer 1512. This primitive contains information requesting that link interface layer 1512 make an allowance for every possible SAPI identifier that can be associated with the negotiated TEI. As explained with respect to FIG. 14, the SAPI defines how a logical link is being used; whereas, the TEI simply identifies a terminal on the other side. The request for link interface layer 1512 to make allowance for SAPI identifiers makes provision for entity 1607 to establish these SAPI identifiers at a later point.

Now, entity 1607 transmits a MDL_UDATA_REQ 1504 primitive whose information contains the address of a specific TEI and the node number of node 101. Primitive 1504 is converted by layer 1512 to UI 1522. The reason for sending the node number using primitive 1504 is to determine whether the other peer entity is a switching node such as switching node 102. The other entity may also be a public network or a BRI telephone. In response to UI 1522, if the other entity is a node, it responds with its node number by the transmission of UI 1523 whose information includes the other entity's node number. Layer 1512 responds to UI 1523 by transmitting MDL_UDATA_IND 1505 primitive. If the other entity is not a node, it fails to recognize UI 1522 and does not respond, resulting in a time out. In response to the time out, entity 1607 via path 1509 communicates LINK_AVAIL 1511 primitive to entity 2001 which is described in greater detail with respect to FIG. 20. At this point, entity 1607 has accomplished the following functions: framing has been established, the TEI has been identified, link interface 1512 has been advised to prepare for the establishment of different services via SAPI identifiers such as signaling, an attempt has been made to exchange node numbers, and the determination has been made that the interface is now ready to be used by higher layers. Entity 1607 now advises entity 2001 via the LINK_AVAIL 1511 primitive that the interface is now ready for use and whether or not the interface is a switching node.

Entity 2001 has to determine whether to establish a signaling link with the other entity. If entity 2001 already has a signaling link to the other peer entity in another switching node, entity 2001 does not proceed with primitives 1506 and 1507. Entity 2001 has a signaling link with the other entity if the switching node of the other peer entity has an established interface with switching node 101. If entity 2001 needs to establish signaling, entity 2001 transmits a DL_ESTABLISH_REQUEST 1506 primitive which contains information requesting that a signaling link (LDC) be established to the other entity. Layer 1512 converts primitive 1506 to SABME 1524. If the other entity agrees, it transmits UA 1525 back which layer 1512 converts to DL_ESTABLISH_CON 1507 primitive. After receipt of primitive 1507, entity 2001 transmits a LDCN_AVAIL message to transport software layer 532 advising the transport software layer that a new LDC has become available. In addition, the LDCN_AVAIL message also informs transport software layer 532 whether the LDC is communicating with another switching node, central office, long distance network, a telephone, or an unidentified entity.

In forming the DL_ESTABLISH_REQUEST 1506, entity 2001 uses the node number received in LINK_AVAIL 1511 primitive to determine the position of the new node within the node hierarchy. As previously mentioned, each node has a unique node number, and the number itself determines the position within the node hierarchy. In addition, this information is utilized to decide which entity is going to be the user or the network on a PRI interface. If this relationship is not correct on a PRI link, the link will not become operational. Before the transmission of DL_ESTABLISH_REQUEST 1506, the signaling link has not yet been established so that the determination of user and network has not been made. Primitives 1501 through 1505 occur before any LAPD link is established. For this reason, all the frame commands are unnumbered. This frees the entities from having to determine the network and the user destinations. Before the transmission of primitive 1506, entity 2001 compares the node numbers and from this comparison determines which of the entities will be defined the user or the network. For other entities such as the public network, this destination is specified. If the other entity is unknown with respect to being a network or a user, entity 2001 initially tries to come up as a user when transmitting out primitive 1506. If this fails, entity 2001 determines this after a timeout period is exceeded. If a timeout occurred, entity 2001 then transmits out a second primitive 1506 designating itself as the network.

Figure 16:
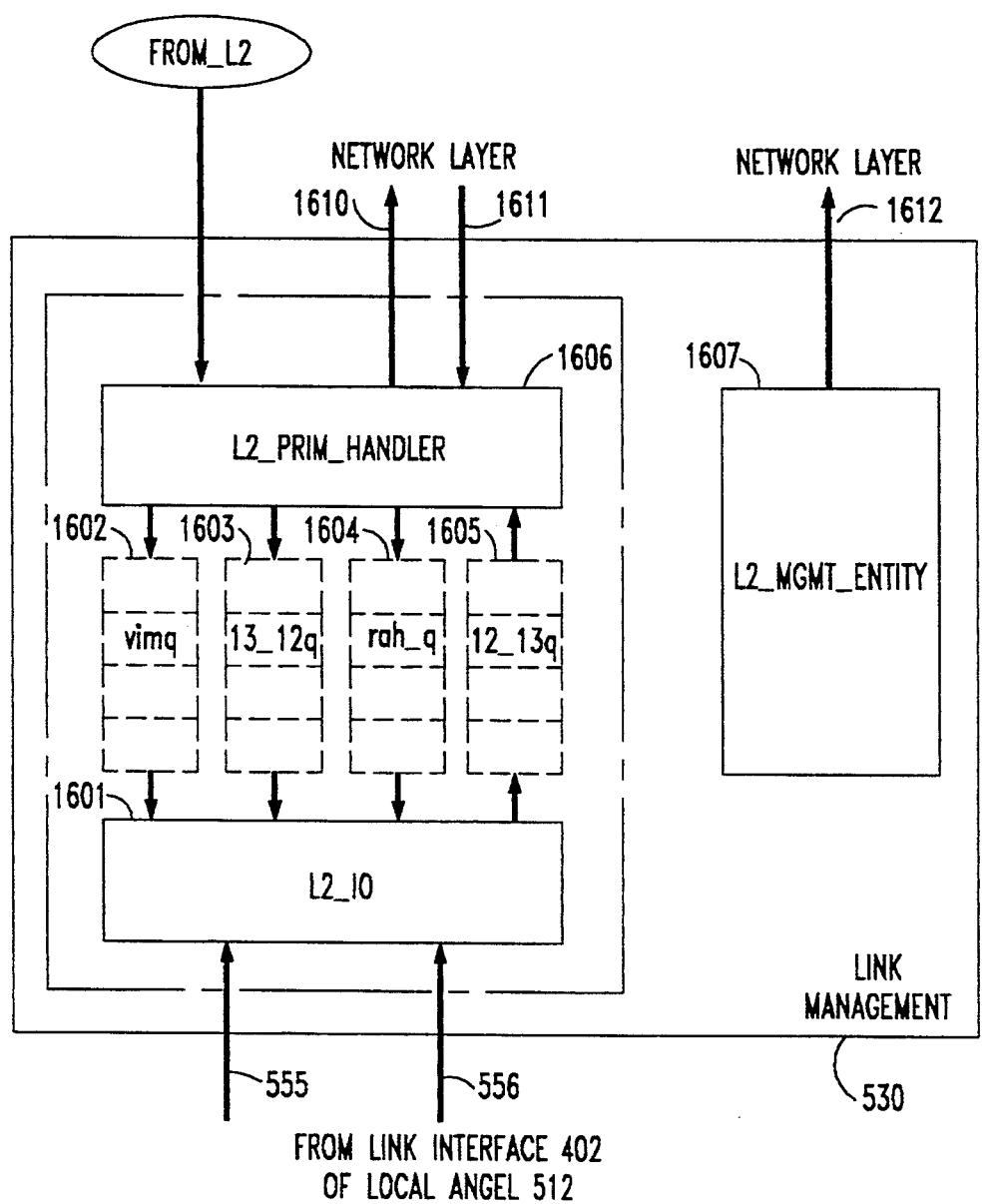
FIGS. 16 through 19 illustrate, in greater detail, the software architecture for a link interface.

Link management 530 is shown in greater detail in FIG. 16. Link management 530 consists of blocks 1601, 1606, and 1607 and queues 1602 through 1605. Using queues 1602 through 1605, L2_IO 1601 communicates data with link interfaces such as link interface 402 of FIG. 4 in local angel 512. L2_PRIM HANDLER 1606 is concerned with receiving and placing information into queues 1602 through 1604 from network software layer 531. Block 1606 also makes the determination of whether information should be transferred to network software layer 531 or to L2_MGMT_ENTITY 1607. In addition, block 1606 performs the mapping between the sintf number and the switch and aintf number. L2_MGMT_ENTITY 1607 is concerned with performing the functions of layer management 210 at the link management level.

Figure 17:
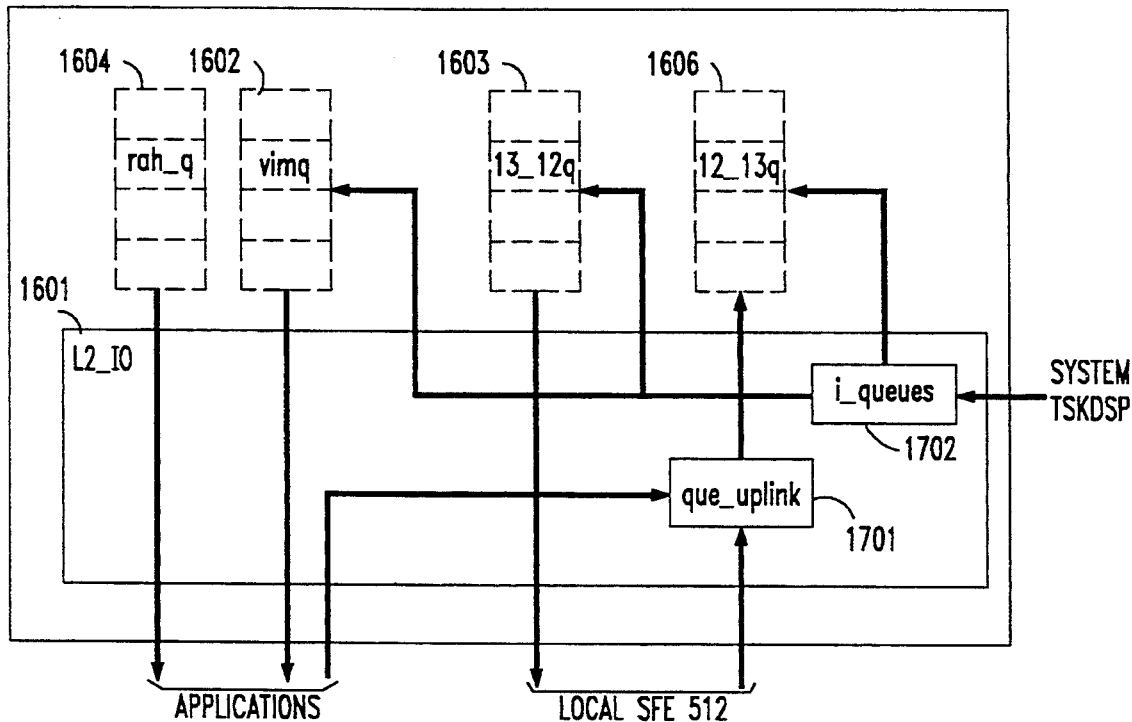

L2_IO 1601 is illustrated in greater detail in FIG. 17. Que_uplink 1701 transfers information received either from the VIM application or remote angel handler application or local angel 512 into 12_13q 1605.

The remote angel handles the L2_L3 function, the communication handler function, and the layer management which are running in the remote angel. Greater detail on the operation of the remote angel is given in the previously referenced copending application. Information flows directly from queues 1602 through 1604 to either the applications or the local angel. The queues are initialized by i_queues 1702 under control of the system task dispenser. Blocks 1701 and 1702 are subroutines which are called by the appropriate entities.

Figure 18:
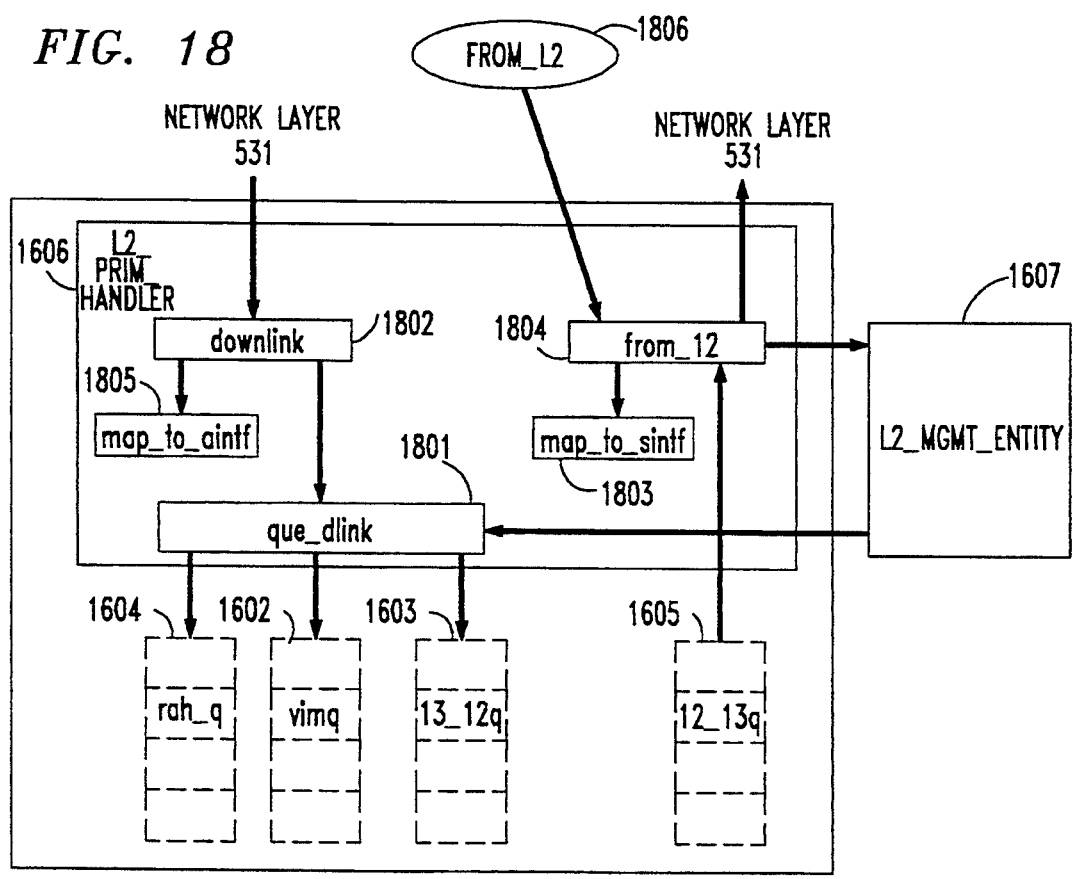

L2_prim_handler 1606 is illustrated in greater detail in FIG. 18. With respect to data received from the different angels, block 1606 determines whether this information should be transferred to network software layer 531 or L2_MGMT ENTITY 1607. This function is performed by from_l2 1804 which reads the primitives contained in queue 1605. Note that block 1804 is periodically invoked by the system task dispenser to remove primitives from queue 1605 (this is indicated by oval 1806). Block 1804 makes the decision of where to transfer the primitives stored in queue 1605 by examining these primitives. If the primitive starts with a DL mnemonic, the primitive is to be transferred to network software layer 531; if the primitive starts with a mnemonic of MDL or MPH, the primitive is to be transferred to L2_MGMT_ENTITY 1607. The primitives transferred to or from L2_MGMT_ENTITY 1607 are in three general classes. The first of these classes is information concerning the physical status of links in switching node 101. The second class is signaling being received from another link management layer in another node. An example of the second class is the signaling that occurs between switching node 102 and switching node 101 as described with respect to FIG. 15. With respect to second class, the overall function provided by L2_MGMT_ENTITY 1607 is to negotiate with its corresponding peer to establish node numbers and to bring up an interface. The third class is the control of the interfaces within switching node 101.

Returning to FIG. 18, if from_l2 1804 determines that the primitive is not to be transferred to block 1607 of FIG. 18, block 1804 maps the switch and aintf numbers to the sintf number by invoking map_to_sintf 1803. After obtaining the sintf, from_l2 1804 transfers the primitive to the network software layer 531. Messages coming from network software layer 531 are first processed by downlink 1802 which invokes map_to_aintf 1805. The latter subroutine converts the sintf number to the switch and the aintf numbers. Once the switch and aintf numbers have been obtained, downlink 1802 invokes que_dlink 1801. Also, downlink 1802 converts the message protocol received from network software layer 531 into an intra-link level protocol resulting in the primitive being transferred to subroutine 1801 which then places the primitive in queues 1602, 1603, or 1602 based on the switch number.

Figure 19:
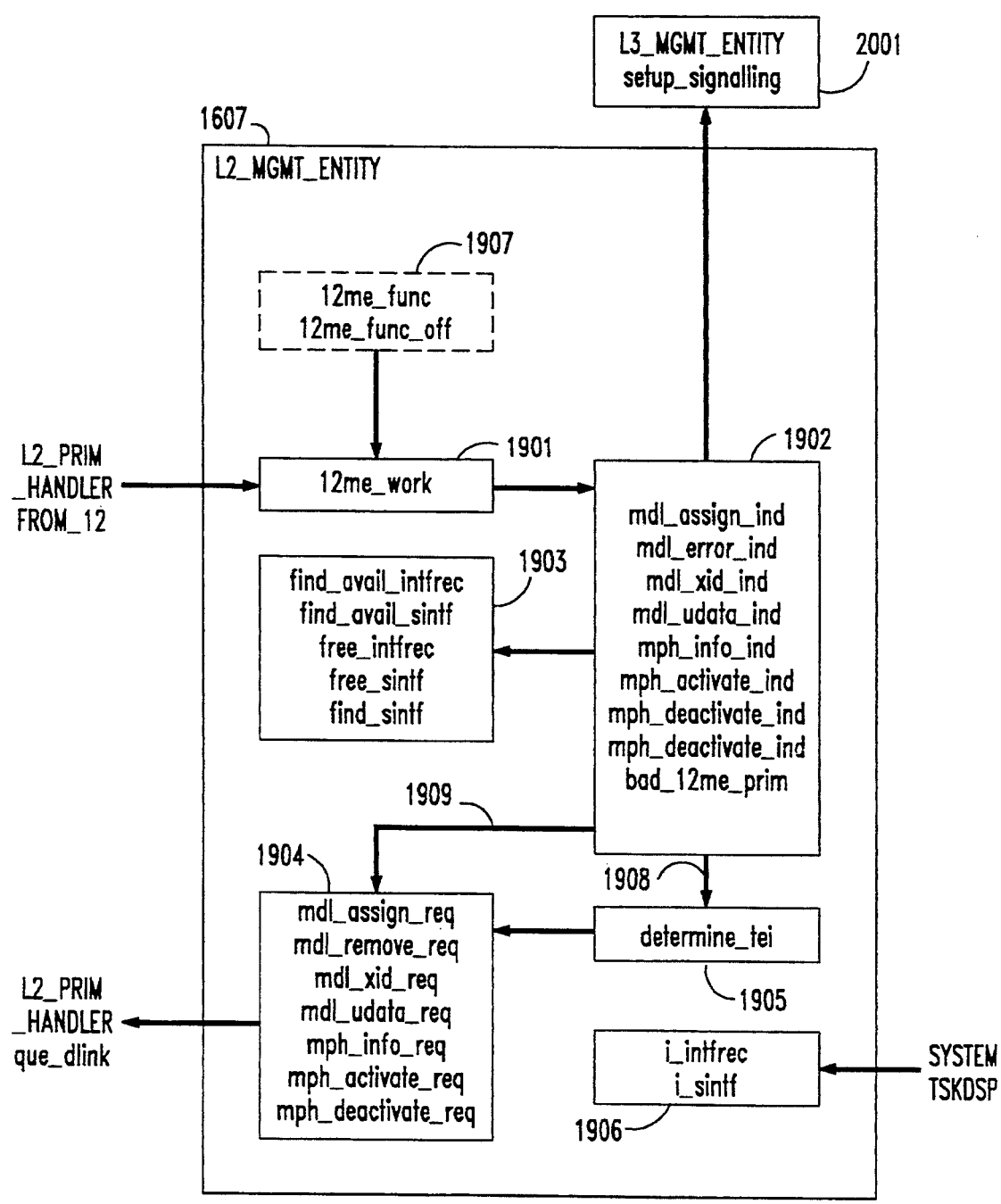

Now consider information which is being received by que_dlink 1801 from L2_MGMT_ENTITY 1607 as illustrated in FIG. 18. In explanation of the type of information that is being transferred from block 1607 to subroutine 1801, reference is now made to FIG. 19. During initialization of an interface, block 1901 activates certain subroutines in block 1902. Once activated, these subroutines activate other subroutines in block 1904. The subroutines in block 1904 transmit messages to the physical or virtual interface being initialized. Examples of subroutines in block 1902 activated by messages from an interface to transmit messages back to the link interface via block 1904 is given with respect to FIG. 15. For example, when node numbers are to be exchanged, subroutine MDL_UDATA IND of block 1902 is activated which in turn activates subroutine MDL_UDATA_REQUEST of block 1904. In addition, the subroutines of block 1902 utilize the subroutines of block 1903 to find sintf and intfrec numbers. L2_MGMT_ENTITY 1607 assigns the sintf numbers when a new interface is established and allocates memory for the interface within a management information base such as management information base 561. In addition, entity 1607 frees sintf numbers when an interface is discontinued. The functions of entity 1607 are performed in conjunction by subroutines in blocks 1902 and 1903 of FIG. 19. Block 1906 is utilized by the system task dispenser to initialize the intfrec and sintf numbers. In addition, some of the subroutines in block 1902 can transmit information up to the management entity (L3_MGMT_ENTITY 2001 shown in FIG. 20)

Figure 20:
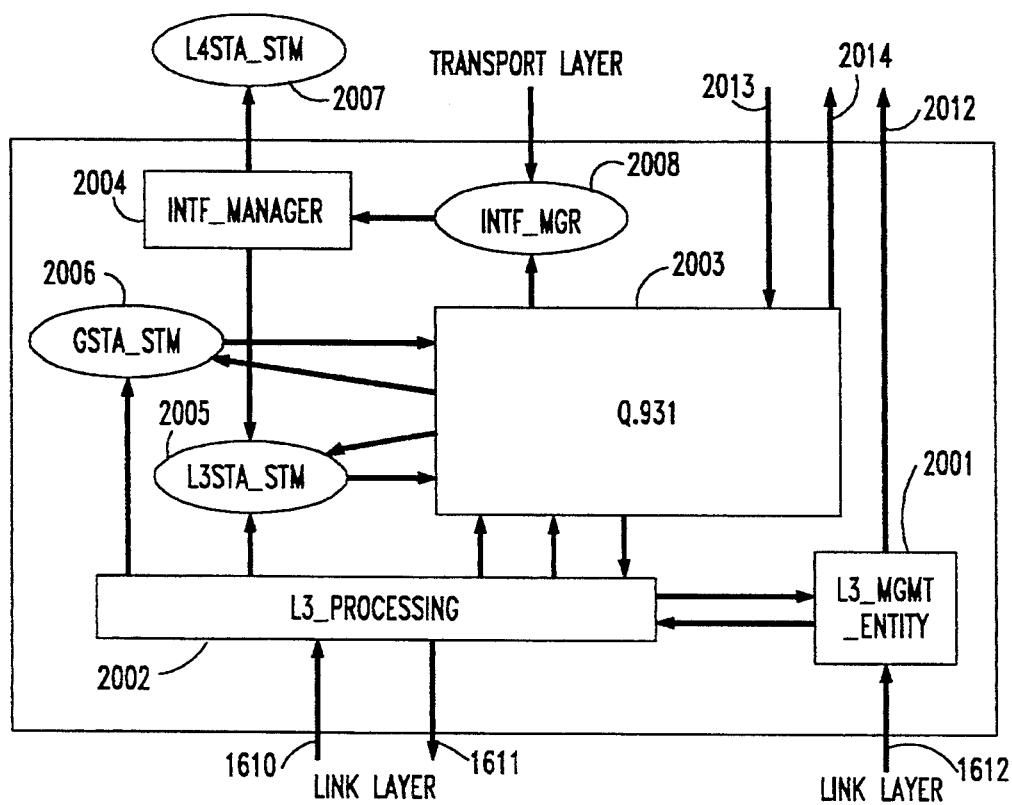
FIGS. 20 and 21 illustrate, in greater detail, a software architecture for a network layer.

FIG. 20 illustrates a detailed block diagram of network software layer 204. There are two paths flowing between software layers. One is a signaling path which is designated as paths 1610 and 1611, and the other one is a management information path which allows management entities to communicate and is designated as paths 1612 and 2012. An example of management information stored in a management information base such as management information base 561 is the sintf number which is inserted by entity 1607, but the sintf is also used by different management entities in higher layers. Another example is the framing indication for an interface which is placed in the management information base by entity 1607. The management entity of the transport software layer utilizes this framing indication to determine whether or not it has a transport connection to a particular node.

In FIG. 20, L3_PROCESSING 2002 is responsible for communicating signaling information to and from link management 530. L3_MGMT_ENTITY 2001 is responsible for establishing and removing signaling paths which are used for connections. For example, block 2001 initially transmits the setup message to initiate the setting up of a call. This message is transferred down to link management 530 for transmission. Q.931 block 2003 is responsible for all protocol handling. INTF_MANAGER 2004 is responsible for interfacing with transport software layer 532.

Figure 21:
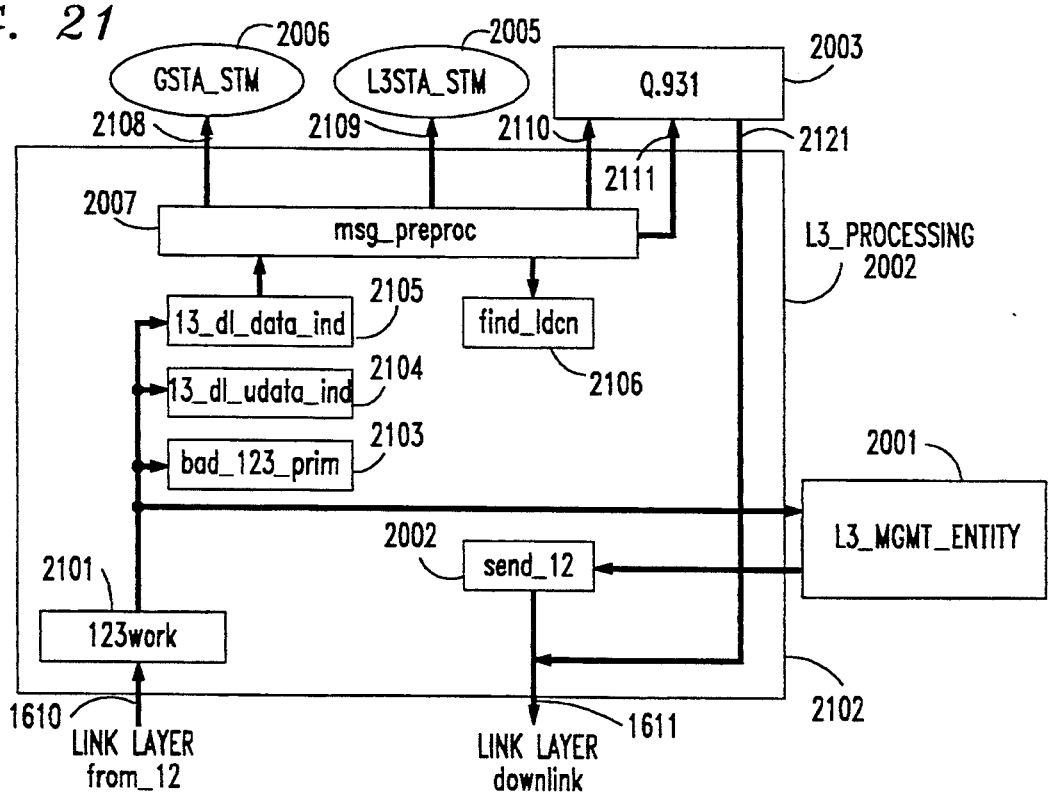

L3_PROCESSING 2002 is illustrated in greater detail in FIG. 21. As information is received from link management 530, 123work 2101 decides whether the messages should be transferred to L3_MGMT_ENTITY 2001 or to subroutines 2103 through 2105. Subroutine 2103 processes primitives from the link layer which are not recognizable and simply records the fact that such a message has been received. Block 2104 can be used to receive the DL_UDATA_IND primitive. L3_dl_data_ind 2105 handles actual signaling messages when called from 123work 2101. Subroutine 2105 handles the Q.931 messages and transfers these to msg_preproc 2107. Subroutine 2107 does some of the initial Q.931 verification of the message. These functions include assuring that the protocol discriminator specifies one of the Q.931 protocols, checking the call reference value, and checking the message type to assure that it is a valid message type. The call reference value is checked for being a valid value and whether it refers to a currently active call or a new call for which resources are available within switching node 101 to handle.

Msg_preproc 2107 either transfers the message to Q.931 block 2003 or to one of the state machines, GSTA_STM 2006 or L3STA_STM 2005 of FIG. 20. If the message is a global message, it is passed to state machine GSTA_STM 2006. (A global message is one that effects every call on an entire interface, such as a reset on a PRI link.) State machines 2005 and 2006 take care of particular types of messages and utilize block 2003 to process these messages. If the call reference value indicates a regular message, state machine 2005 is called. If the call reference value is null, then block 2002 passes this message directly to block 2003, since no state processing is required. In addition, if block 2107 of FIG. 21 determines that it has received an incorrect message, it transfers a message up to block 2003 of FIG. 20 requesting the transmission of a Q.931 message back to the other side informing the other side that an invalid message was received. (An example of an invalid message is an invalid protocol discriminator.) When msg_preproc 2107 is processing the message from link management, it utilizes find_ldcn 2106 to determine the translation between the sintf number and the LDCN. The LDCN is used to identify messages to the entities above L3_PROCESSING 2002. During the establishment of signaling by L3_MGMT_ENTITY 2001, block 2001 defines the correspondence between the LDCN and sintf number. The output of Q.931 block 2003 flows directly through block 2002 since block 2003 has formatted the message for link management 203. However, messages from L3_MGMT_ENTITY 2001 must first be formatted by subroutine send_l2 2102 before being transferred to link management 203. Note, when L3_MGMT_ENTITY 2001 selects the LDC, block 2001 reports this number up to the management entity at the transport level via path 2012 of FIG. 12.

Consider elements 2003 through 2008 of FIG. 20. GSTA_STM 2006, L3STA_STM 2005, and 14STA_STM 2007 represent information being placed into state queues for execution by the system task dispenser. For example, when L3_PROCESSING 2002 receives a global call reference value, it places information into the queue for GSTA_STM 2006 which results in the system task dispenser initializing the global state machine resulting in a call to block 2003. Task 2005 handles messages which have a specific call reference value and initiates, under control of the system task dispenser, the appropriate routines within block 2003.

Block 2003 is responsible for performing all of the Q.931 protocol handling. The functions performed by block 2003 in processing the Q.931 protocol are clearly defined in the CCITT Blue Book specifications. Ovals 2005 and 2006 represent the execution of a task by the system task dispenser. These tasks handle particular types of call reference values and perform their work by calling specific parts of block 2003; whereas the tasks represented by ovals 2005 and 2006 are not directly specified by the ISDN specifications their functions are. The purpose of showing a task being initiated out of the ovals is to indicate that the system task dispenser controls the initialization of these tasks. For example, oval 2008 represents the request that block 2004 be executed when information is put into a queue of the system task dispenser indicating that block 2004 should be executed.

Block 2004 serves as an interface to transport software layer 205 and processes messages coming down from the transport software layer 205 either to convert these messages into signaling messages to be processed by block 2003 via oval 2005 or to handle request for facilities or transport capabilities from the higher levels. The primary job of INTF_MANAGER 2004 is the management of facility and transport for a particular interface. In order to do this, block 2004 is responsible for handling the initial set up of calls, e.g., the call request and negotiating the number of channels necessary for each call. In order to perform this function, block 2004 is aware of the number of B channels associated with each LDC and chooses a particular B channel or channels to be used for a call. It is not the responsibility of block 2004 to determine a path through a switching node such as switching node 101 or a path through multiple switching nodes. Transport layer 205 has the responsibility for finding that type of a path as is described with respect to FIGS. 22, 23, and 24. Block 2004 determines by negotiation which B channels are used for a particular call. This negotiation is carried out with another corresponding entity in the other system element also attempting to set up that call, e.g., switching node 102 of FIG. 5.

During the set up of a call originated by an individual telephone, block 2004 initially negotiates with the telephone concerning which B channel is utilized to transport the voice information and handles the signaling involved in the Q.931 protocol. In addition, interface manager 2004 sends the appropriate commands down to the link and physical layers to cause the interface itself to be appropriately set up.

As the call progresses, transport software layer 205 determines where the call is going to and sets up the internal switching within the node 101. Transport software layer 205 uses the intra-nodal routing routine to accomplish this function. After the transport has been arranged through node 101, transport software layer 532 invokes block 2004 via oval 2008 to negotiate the setup of the call on the outgoing interface of node 101. Block 2004 performs this in a similar manner to the negotiation of the original setup request from the originating telephone. In summary, block 2004 is responsible for the selection by negotiation which B channels are used from a particular system interface for a call.

To better understand the functions of the blocks illustrated in FIG. 20, consider the following detailed example concerning the setting up of a call to switching node 102 from switching node 101. Initially, there would be a request (DL_DATA_IND) primitive coming up from link management 530. L3_PROCESSING 2002 is responsive to this primitive to check the existence of a specific call reference value and to check the protocol. Block 2002 then places into the queue for L3STA_STM 2005 the fact that a message has been received. Under control of the system task dispenser, oval 2005 initiates the execution of block 2003 to do the protocol processing on the received message to assure, for example, that the message is of the correct state. Block 2003 then indicates to the system task dispenser via oval 2008 that there is a call request and that block 2004 should be executed. Block 2004 then verifies that there is a B channel available on the requested interface to handle this call (if the call requires a B channel) and sends back a call proceeding request via oval 2005. Under control of the system task dispenser, oval 2005 initiates block 2003 to generate the call proceeding message back to network software layer 531 in the originating telephone. In addition, block 2004 initiates transport software layer 532 via oval 2007 to determine that the required resources exist within node 101 to complete the call. The required resources may be limited to those of switching node 101 or may require resources in other nodes in order reach the destination node. It is the responsibility of transport software layer 532 and session software layer 533 to determine whether the destination node can be reached. Note, when block 2003 is invoked to transmit the call proceeding message, block 2003 first checks to make sure that the transmission of the call proceeding message was correct for this stage of the call and forms and sends the call proceeding message to L3_PROCESSING 2002. Block 2002 forms this message into a dl_data_req primitive which is transmitted to link management 530.

During the processing of the information by transport software layer 532, if transport software layer 532 has no information for routing to the destination node, transport software layer 532 in conjunction with session software layer 533 determines the path to the destination node. Session software layer 533 determines which node the call is destined for by evaluating the dial digits. Once session software layer 533 has determined the node, transport software layer 532 is responsible for determining how to get to that node. After determining how to route the call, transport software layer 532 sets up a call to the destination node. In order to set up the call to the other node, transport software layer 532 invokes INTF_MANAGER 2004 via oval 2008. Block 2004 selects an interface that is controlled by the LDC and connected to the destination node, and block 2004 then selects a B channel on that interface. After accomplishing this selection, block 2004 negotiates the set up of the call with the other node. In order to negotiate the set up of the call, block 2004 invokes the state machine associated with oval 2005 to have the proper message generated by block 2003 for transmission to the destination node. Block 2004 also selects the call reference value to be utilized on the LDC. Block 2003 verifies that the message can be transmitted (a setup message) and formulates this message and transfers it to L3_PROCESSING block 2002.

The information on paths 2013 and 2014 comprises messages that were received that had a null call reference value. These messages fall into two general categories. The first category is messages which are being transported back and forth between layers 533 through 536 with their equivalent peers in another node. The second category of messages is those messages that are not call related. For example, the button pushes on a station set are not call related and are transmitted from the station set to the node with a null call reference value.

Call Routing—Detailed View

This section describes call routing from the prospective of session software layer 533, transport software layer 532, and network software layer 531. The previous description with respect to FIGS. 20 and 22 provides greater detail on the actions performed by network software layer 531 in setting up a call.

Figure 22:
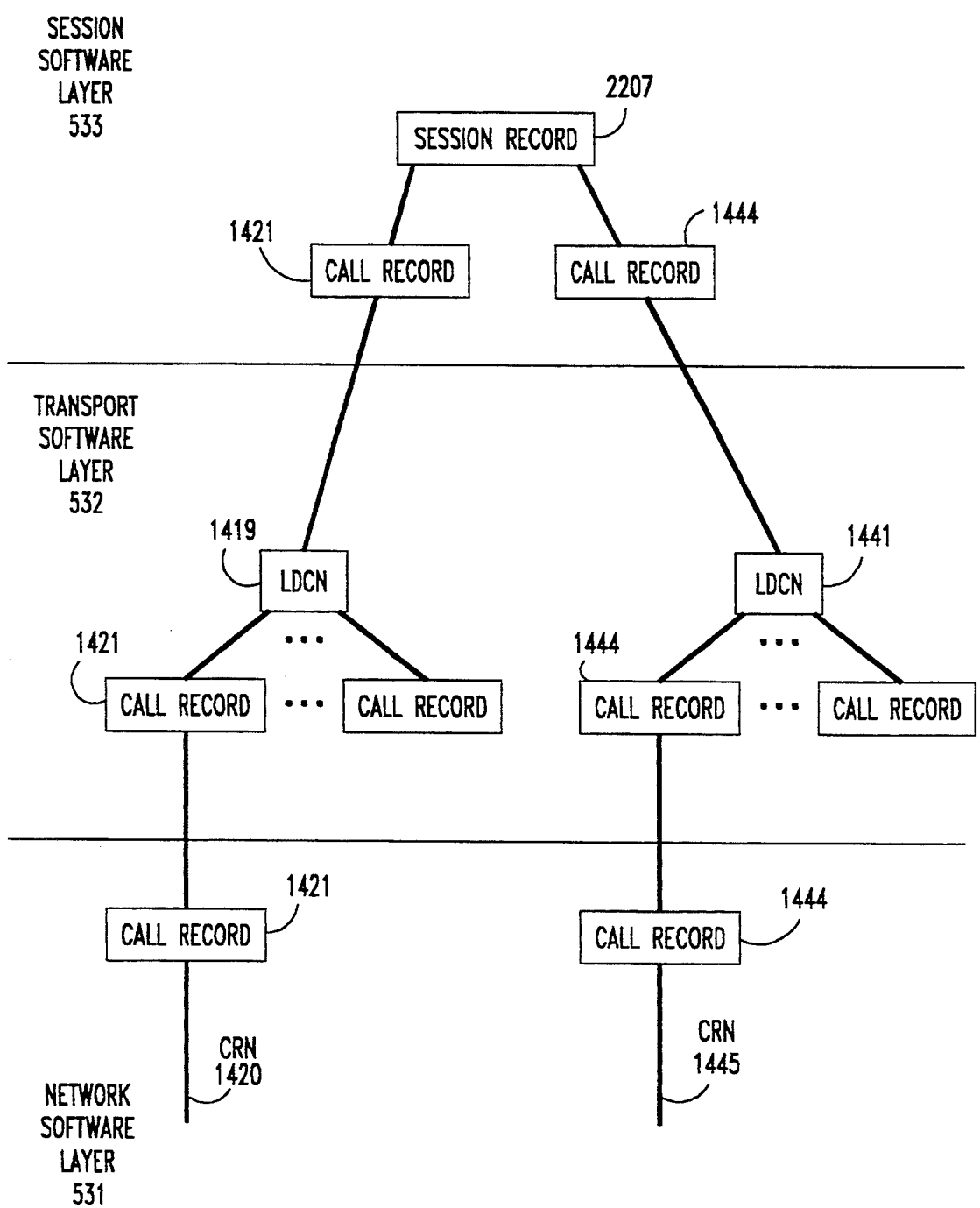
FIG. 22 illustrates the logical structure of a call set up through the network, transport, and software layers.

FIG. 22 illustrates the manner in which calls are identified and processed between network software layer 531, transport software layer 532, and session software layer 533. Switching node 101 is executing these software layers. At network software layer 531, each half of a call is identified by the CRN number, e.g. CRN 1420, and call record 1421 as previously described with respect to FIG. 14. As can be seen from FIG. 22, the call record is common throughout the software layers, and each layer uses additional information along with the call record. The call records are taken from a common table within each switching node, and a call record number is unique within a particular switching node.

Transport software layer 532 identifies each half of a call by the LDCN and call record number. The LDCN is utilized because the information illustrated in the level 4 routing tables is identified by the LDCN number which denotes the link (or set of links) out of a switching node to another switching node. Notice that the call record is identified identically at all three software layers as illustrated in FIG. 22 for a particular call. Session software layer 533 is the point within the software architecture where calls are joined together for purposes of exchanging signal information by each call having a unique session set up for it such as session 2207. The session record is associated with two call records such as call record 1421 and call record 1444 with each call record being part of half of a call. (Each half of a call is referred to as a "half call".) An exception to this rule is if the call is to an application. In that case, only one call record is utilized since the other half of the call terminates at the application software layer.

To understand how calls are processed by the three software layers illustrated in FIG. 22, consider the examples given in the following paragraphs. For these examples reference must be made to FIG. 14 which illustrates the interfaces associated with call records 1421 and 1444. Call record 1421 is associated with PRI link 150, and call record 1444 is associated with BRI link 144 in the following example.

Assume that a call is being received on PRI link 115 which is destined for BRI station set 124 via BRI link 144. LDCN 1419 was established when PRI link 150 became active. When a setup message associated with the call is received via LDCN 1419, call record 1421 is established and associated with LDCN 1419 as the first half call is being initiated. The destination node number and dialed telephone number are transferred from network software layer 531 to transport software layer 532. Transport software layer 532 determines that switching node 101 is the destination node and sets a node flag which is a flag that records this type of information. The node flag and dialed number are then communicated to session software layer 533. Session software layer 533 determines from the dialed number that the call is directed to BRI station set 124. Session software layer 533 sets up session record 2207 and establishes call record 1444 as being associated with BRI station set 124. By establishing these two records, session software layer 533 has started the initialization of a second half call and completed the first half call. Session software layer 533 transmits a setup request to transport software layer 532 identifying that this setup request is associated with LDCN 1441. The latter LDCN number was established when BRI link 144 became active. Transport software layer 532 then transmits the setup request to network software layer 531. The latter software layer transfers the setup request to BRI station set 124 via lower software layers and BRI link 144. Assuming that BRI station set 124 responds with an alerting message, this message is transferred up through the second half call which is identified by call record 1444 via network software layer 531 and transport software layer 532 to session software layer 533. The latter software layer utilizes information in session record 2207 to identify the first half call which is associated with call record 1421. The alerting message is then communicated by transport software layer 532, network software layer 531, lower software layers, and PRI link 150 to the originating switching node.

For a second example, assume that an application in switching node 102 transmits a setup message to establish a logical call with an application in switching node 101. The setup message is processed by setting up the first half call in the same manner as was done in the first example. However, after session software layer 533 has established session record 2207 it does not establish a second half call but rather transfers the information to the application in applications software layer 536. The application responds with a connection request which is transferred down through software layers 533, 532, and 531 after which it is communicated to switching node 102 via PRI link 150.

For the third example, assume that a call is being placed from switching node 102 to switching node 104 via switching node 101. In addition, assume for this example that LDCN 1441 is associated with PRI 155 which interconnects switching node 104 to switching node 101 as illustrated in FIG. 1. Further, assume that the node number designates switching node 104. When the setup message is received from switching node 102 via PRI link 150, network software layer 531 generates a setup indication which is communicated to transport software layer 532 and establishes call record 1421 which starts the setting up of the first half call. Transport software layer 532 examines the node number and determines that switching node 101 is not the destination switching node; hence, layer 532 does not set the node flag. The dialed number along with the node flag is communicated to session software layer 533 which, because the node flag is not set, does not attempt to route a call based on the dialed number. Since in the present example the node flag is not set, session software layer 533 establishes session record 2207 is established and call record 1444 is selected which starts the setting up of the second half call. The node and the call record number are then communicated to transport software layer 532 as a setup request. Transport software layer 532 interrogates the level 4 routing table and determines that LDCN 1441 is a path to switching node 104. Transport software layer 532 then associates call record 1444 with LDCN 1441 and transmits the setup request to network software layer 531 which then establishes communication with switching node 104 via PRI link 155. Note, as previously discussed in FIGS. 6 through 12, it is possible that the node number designated switching node 101 as the destination node but that the dialed number was determined by session software layer 533 to exist on switching node 104. Whereas different functions would be performed by software layers 532 and 533, the two half calls would still be set up as previously described and the setup message would be routed to switching node 104.

Figure 23:
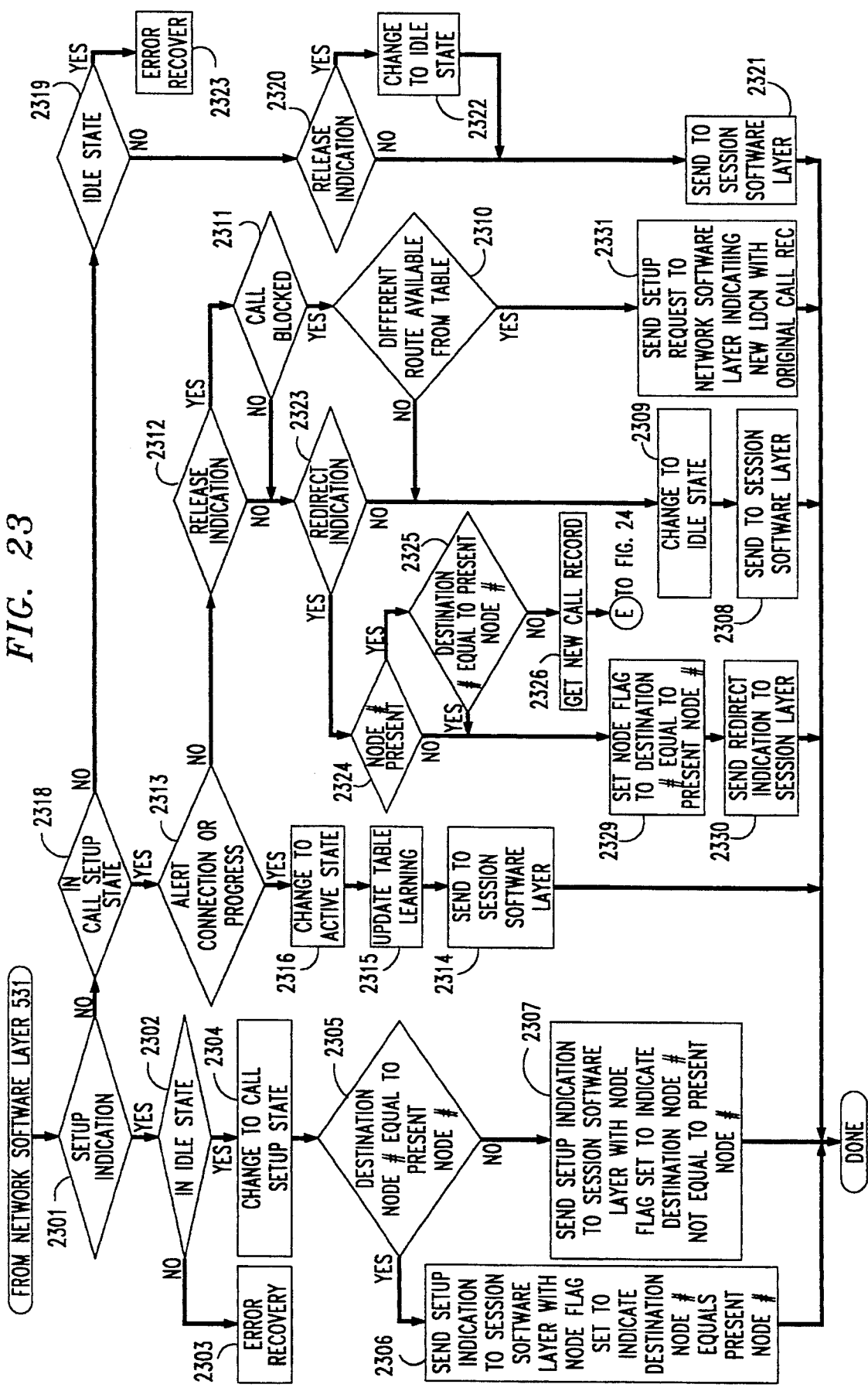
FIG. 23 illustrates, in flowchart form, the response of a transport layer to an indication from the network software layer.

FIG. 23 illustrates the flow of information being received by transport software layer 532 for a half call from network software application 531. FIG. 23 illustrates the actions that are taken by the routines at transport software layer 532 in processing each unique combination of LDCN and call record such as LDCN 1419 and call record 1421 which define a half call. Each half call is assumed to be able to have three states at transport software layer 532: idle state, setup state, and active state. The idle state is the initial condition before the call record is associated with an LDCN. The setup state occurs after the setup indication is received from network software layer 531. The active state is entered from the setup state after the first end-to-end message is received from the other half of the call e.g. received from session software layer 533. An end-to-end message is an alerting, connection, or progress message. The software routine illustrated in FIG. 23 is responsive to indications received from network software layer 531 to either send a request back to network software layer 531 or to send indications to session software layer 533. The flow chart of FIG. 23 has two major sections. The first section comprises blocks 2302 through 2307 and is concerned with establishing a new half call in response to a setup indication from the network software layer. The second section comprises blocks 2308 through 2323 and is concerned with an established half call.

Decision block 2301 determines whether or not the indication being received from network software layer 531 is a setup indication. If it is a setup indication, decision block 2302 checks to see if the call is in the idle state. If the call is not in the idle state, error recovery block 2303 is executed since a setup indication should only be received when this half of the call is in the idle state. If the half call was in the idle state, block 2304 is executed to place this half call in the setup state. Decision block 2305 determines whether the node number of switching node 101 equals the destination node number of the setup indication. If the determination is yes, the node flag is set. The flag is available to both half calls. The node flag is utilized to pass this determination to session software layer 533. Blocks 2306 and 2307 are utilized to properly set the node flag to indicate whether or not switching node 101 is the designated node. The setup indication also includes the LDCN and call record number from network software layer 531 specifying which LDCN and call record are being utilized. (In this half of the call, the LDCN is LDCN 1419 and the call record is call record 1421 ). The call record was selected by network software layer 531 when the setup message was received from the physical layer. The LDCN is determined according to the link on which switching node 101 received the setup message.

With respect to block 2307, it will be recalled from the previous discussion with respect to FIG. 4 that the transport software layer performs all the necessary routing of a setup message which is not designated for the receiving switching node. However, it is necessary to transport such a setup message to session software layer 533 so that a session can be established for this call since the call is being routed through the receiving switching node. Block 2307 accomplishes this purpose. With respect to block 2306, it is necessary to pass the setup indication to session software layer 533 so that the latter software layer can perform the necessary actions utilizing the dialed number to determine the destination of the call (either an endpoint or a subsequent switching node).

Returning to decision block 2301, if the indication received from the network software layer was not a setup indication, decision block 2318 is executed to determine whether this half call is in the call setup state. If this half call is not in the call setup state, then decision block 23 19 is utilized to assure that this half call is not in an idle state. The idle state indicates an error at this point, and error recovery block 2323 would be executed. Assuming that this half call is not in the idle state, the indication is checked to see whether it is a release indication. If it is, block 2322 is executed which returns the state of the half call back to the idle state and releases the call record. In both cases whether or not a release indication is executed, the indication is sent to session software layer 533.

Returning to decision block 2318, if the half call is in the call setup state, decision block 23 13 checks to see if this is an alerting, connection, or progress indication which indicate that the call is to go from the call setup state to the active state. ISDN protocol allows for any three of these messages to be given in response to setup message under various conditions. If the answer to the determination in decision block 23 13 is yes, block 2316 is executed to change the half call to the active state. Then, block 2315 is executed to utilize the information contained in the routing vector of the indication (which has been transferred from the network software layer) to update the level 4 routing tables. Finally, block 2314 transfers the indication to session software layer 533.

Returning to decision block 2313, if the answer is no to the determination made by the latter decision block, decision block 2312 is executed to determine whether or not the received message is a release indication. If it is not a release indication, the indication is transferred to the session software layer by blocks 2308 and 2309 since it does not affect this layer. If it is a release indication, this indication is handled in an improved manner in comparison to prior art telecommunication systems. First, the release indication is checked by decision block 2311 to see whether it indicates that the call was blocked. If the call was blocked, decision block 2310 is executed to see whether or not there exists another path to the destination. This logic as determined by decision blocks 2311 and 2310. If block 2310 is executed, an assumption is made that a set up message sent to a distant switching node has resulted in the distant node sending a release message. In response to the release message, switching node 101 is attempting to find another path to the destination switching node utilizing the level 4 routing tables as previously discussed. If a new path is found by decision block 2310, control is transferred to decision block 2331. The latter block sends a setup request to network software layer 531 requesting that the latter software layer attempt to establish the call utilizing a new LDCN number (which is supplied by transport software layer 532) defining the new path using the original session record and call record. Since the original session record is being utilized, it is not necessary for any additional work to be done by session software layer 533; hence, no indication is transferred to session software layer 533. If either decision block 2311 or 2310 makes a negative determination, block 2309 is executed as previously described.

Figure 24:
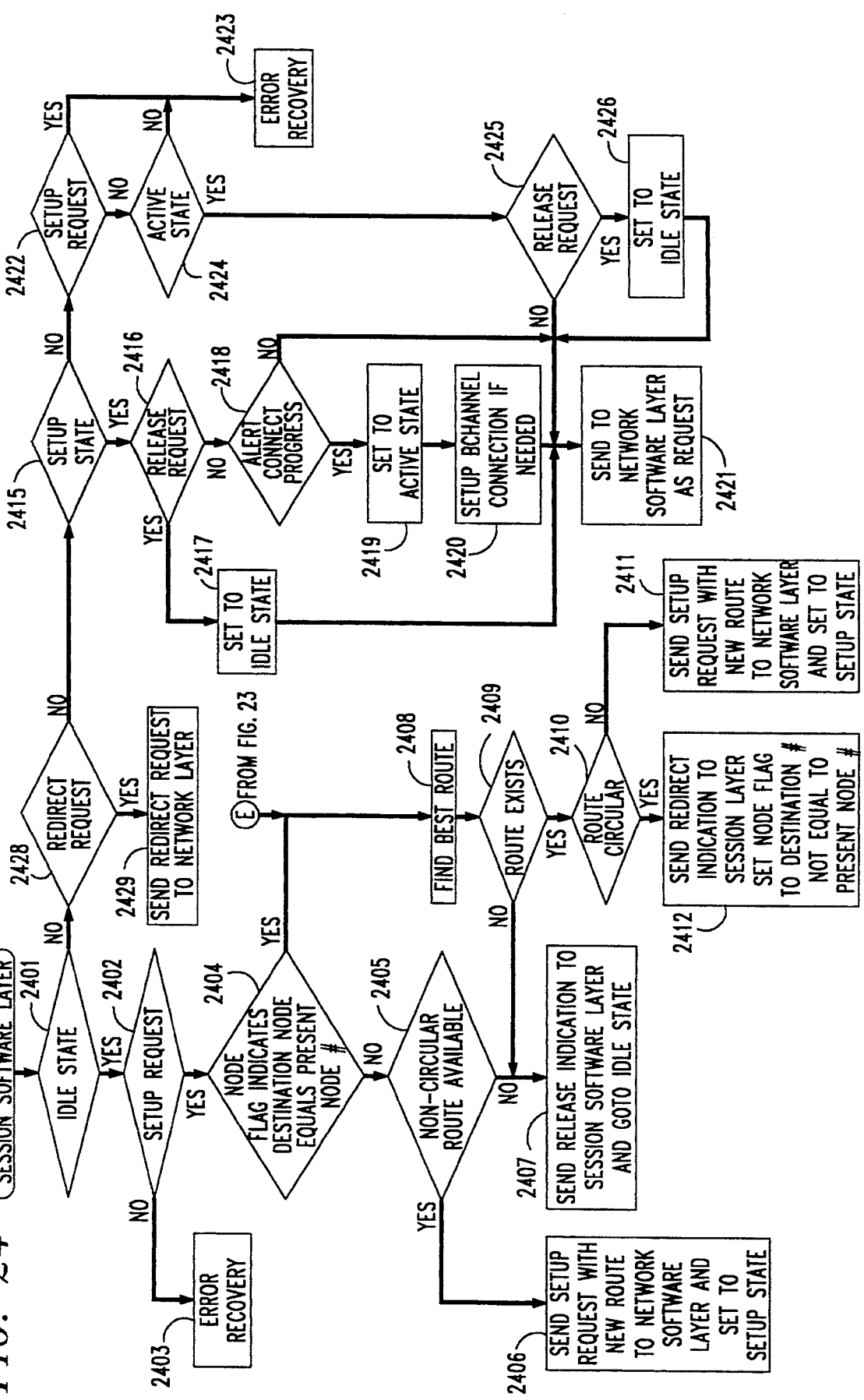
FIG. 24 illustrates, in flowchart form, the response of a transport layer to a request from a session software layer.

FIG. 24 illustrates the actions taken by transport software layer 532 in response to requests being received from session software layer 533. FIG. 24 has two main sections. The first section comprises blocks 2402 through 2412 and is concerned with the initial step of setting up a new half call. The second section comprises blocks 2415 through 2426 and is concerned with an established half call. An established half call is either in the setup or active state.

Decision block 2401 checks whether or not the state of the half call is in the idle state. If the half call is in the idle state, decision block 2402 checks to see whether a setup request is being received from session software layer 533. If it is not a setup request, then block 2403 is executed to perform error recovery. If it is a setup request, decision block 2404 is executed to check the node flag which could have been previously set by transport software layer 532 during processing of the other half call by either decision block 2306 or 2307 of FIG. 23. If the node flag is not set, this indicates that the session software layer is setting up a call originating on this switching node or that this switching node is a tandem point for a previously routed call. In this situation, the transport software layer must either route the call in a forward, non-circular direction or disconnect the call because no route is available. To do this, decision block 2405 determines from the route vector present in the message as received from a distant node and the level 4 routing tables whether or not a non-circular route is available. If there is a non-circular route available, block 2406 is executed to send a setup request along with a LDCN number to network software layer 531. The LDCN identifies the new route. In addition, block 2406 sets the state equal to the setup state. If a non-circular route is not available, block 2407 is executed to send a release request to network software layer 531, to set the state equal to the idle state, and to inform level 5 to remove the session record.

Returning to decision block 2404, if the node flag indicates that the call was destined for the receiving switching node or originated on this switching node, block 2408 is executed to find the best route to the new destination node. (The best route is determined by the route that has the fewest intervening switching nodes). As will be described with respect to FIG. 25, session software layer 533 is responsive to the node flag indicating that switching node 101 is the incoming destination node to change the node number to a new node number if the call must be routed to another switching node. In such a case, switching node 101 is an intermediate node in the route to the other switching node. Decision block 2409 checks to see whether or not a route is found. If a route is found, decision block 2410 determines whether the route found is a circular route. (A circular route is identified if either the new destination switching node is in the list of switching nodes previously passed through or if the route selection would return to a previous switching node.) If it is a circular route, the redirect request is transmitted to network software layer 531 indicating that the node number has been changed and that backing up is the route for the call. The result is that a redirect message is sent to the switching node which transmitted the original setup request to switching node 101 since it is not necessary to route the call through switching node 101. The function of the redirect request was previously described. If the route is not circular as determined by decision block 2410, then block 2411 is executed to send the setup request out on the new route as defined by the LDCN determined in block 2408 to network software layer 531 and to set the state for this half call to the setup state.

Returning now to decision block 2401. If the determination is no, decision block 2415 is executed to determine whether this half call is in the setup state. If the half call is in the setup state, decision block 2416 determines whether or not it is a release request. If it is a release request, then the state of this half call is set to idle. If it is not a release request, then decision block 2418 is executed to determine whether the request is an end-to-end message. If the answer is yes, then block 2419 sets the state of this half call to the active state, block 2420 makes the B channel connection if it was a connect message, and block 2421 sends the request to network software layer 531. If the determination in decision block 2418 was no, then block 2421 is immediately executed.

Returning to decision block 2415. If the determination was no, decision blocks 2422 and 2424 determine whether the request is a setup request and the half call is in the active state, respectively. If the determination made by decision block 2422 was yes or the determination made by decision block 2424 was no, then error recovery block 2423 is executed. Otherwise, decision block 2425 is executed to determine whether or not the request is a release request. If it is a release request, this half call is set to the idle state by 2426 and block 2421 is executed.

Figure 25:
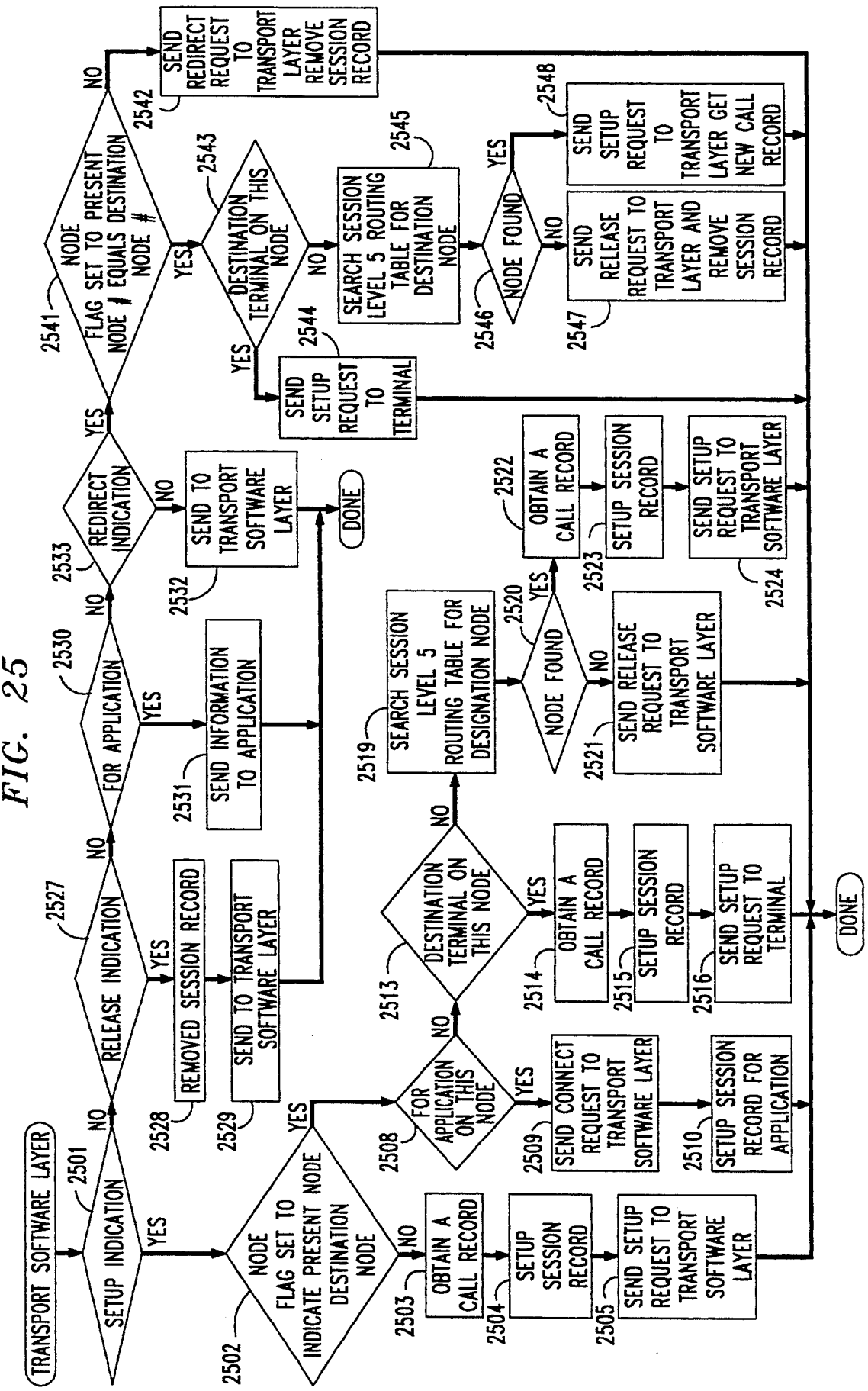
FIG. 25 illustrates, in block diagram, form the response of a session software layer to an indication from a transport software layer.

FIG. 25 illustrates the response of session software layer 533 to indications being received from transport software layer 532. Recall from the discussion of FIG. 22 that the session software layer joins the two half calls to form a complete call utilizing a session record. In addition, calls which are terminated on an application in the application software layer are communicated by the session software layer to and from the designated application. In addition, the session software layer is responsive to a request coming down from an application to establish a call to an application running in another switching node. In addition, the session software layer performs routing on the dialed number as previously discussed utilizing the level 5 routing tables. FIG. 25 illustrates the operation of session software layer 533 in response to indications being received from transport software layer 532. Session software layer 533 is responsive to these requests to communicate the information to an application or to respond by transmitting additional requests to transport software layer 532. Requests transmitted to transport software layer 532 can be for either of the two half calls illustrated in FIG. 22. With respect to certain indications received from transport software layer 532, the session software layer 533 simply communicates these requests to the other half call.

Decision block 2501 is responsive to an indication received from the transport software layer to determine whether or not the indication is a setup indication. If the indication is a setup indication, decision block 2502 is executed to determine whether the node flag indicates that the receiving node (switching node 101) is the destination node of the indication. Recall that the node flag was set by blocks 2306 and 2307 of FIG. 23. If the determination in block 2502 is no, session software layer 533 does not need to perform any routing functions since the routing function will be performed on the node number which designates the destination node. However, a call record is obtained by block 2503 for the new half call which must be set up. For example, assuming that the setup indication had been received for the first half call dealing with call record 1421 of FIG. 22, the call record to be obtained for the second half call would correspond to call record 1444 assuming that the call is being transported on BRI link 144. After the call record is obtained, block 2504 sets up a session record to associate the two half calls. Finally, block 2505 sends the setup request to transport software layer 532 so that the latter software layer can perform the routing of the setup message based on the node number for the second half of the call.

Returning to decision block 2502, if the answer to the determination is yes, decision block 2508 is executed to determine whether the half call is intended for an application on switching node 101. If the answer is yes, then block 2509 is executed to send a connect request back to the other switching node concerned with the half call. Note, that a second half call is not set up. However, it is necessary to set up a session record, and this function is performed by block 2510.

Returning to decision block 2508, if the answer to the determination is no, decision block 2513 is executed. If the answer is yes which means that the setup message is for a terminal (such as a BRI station set) connected to the switching node, blocks 2514 and 2515 are executed to establish a new half call, and a setup request is sent to the terminal by execution of block 2516.

Returning to decision block 2513, if the terminal or application is not present on this node it is necessary to try to establish a route to the terminal by first utilizing the dialed number to determine a switching node to which that terminal is connected. This action is performed by block 2519 as was previously described with respect to FIGS. 6 through 12. Decision block 2520 determines whether or not the search for a destination node was successful. If the search was not successful which indicates that switching node 101 cannot identify a switching node which hosts the terminal, block 2521 is executed and results in a release request being sent to transport software layer 532. If a destination node was found, blocks 2522 and 2523 are executed to establish a new half call. A setup request is sent to transport software layer 532 to establish the second half call with the switching node that was determined by execution of block 2519.

Returning to decision block 2501, if the indication is not a setup indication, decision block 2527 is executed to determine whether it is a release indication. If it is a release indication, block 2528 removes the session record which has the effect of removing the call. In addition, the release indication is sent to transport software layer 532 on the second half call. For example, if the release indication was received from the half call associated with call record 1421, block 2529 would transmit the release indication to the half call associated with call record 1444. As can be envisioned, this operation allows the call to be removed through a series of switching nodes.

Returning to decision block 2527, if the indication is not a release indication, decision block 2530 checks to see if the indication is associated with an application. This check is performed by simply examining the session record and communicating the information to the destination given in that record. Hence, if it is an application, block 2531 is executed. However, if it is not an application, the information is sent to the second half call by the execution of block 2532.

Figure 26:
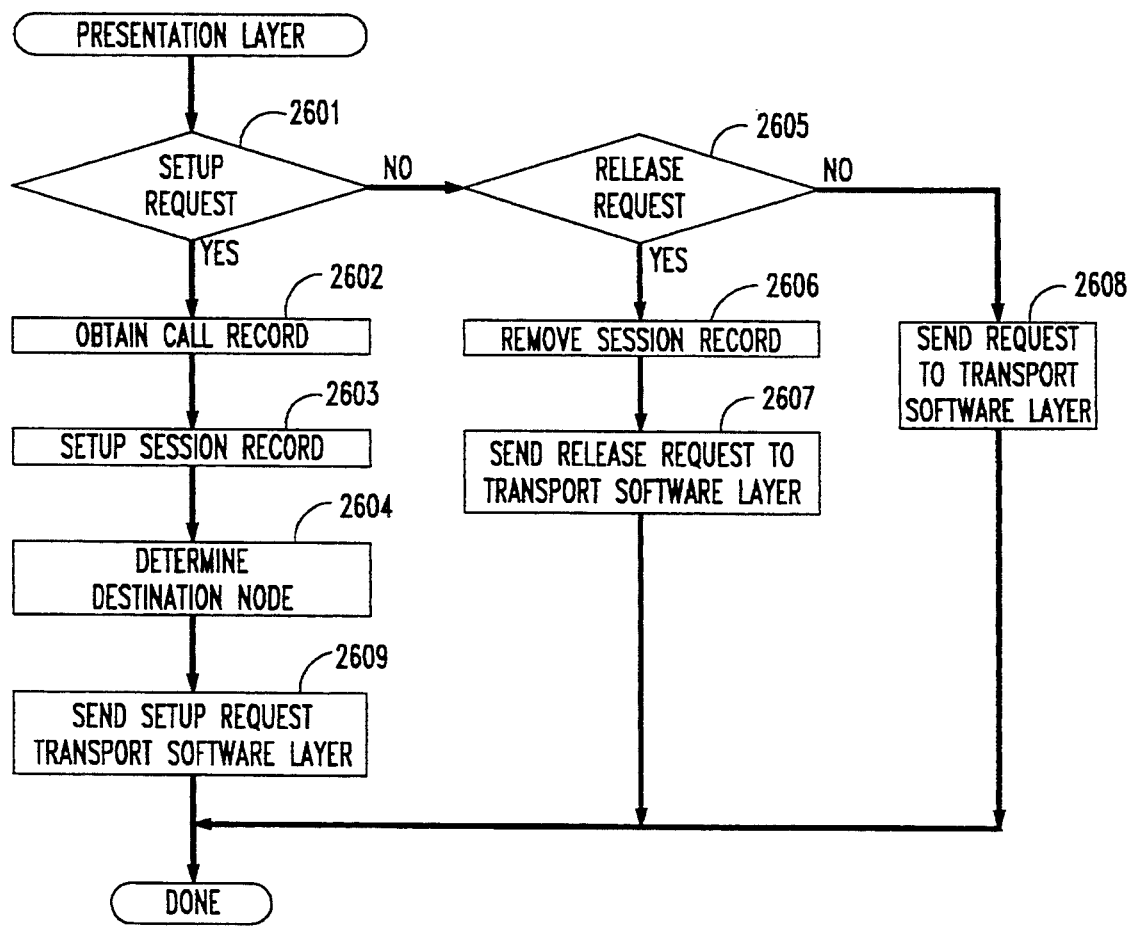
FIG. 26 illustrates, in flowchart form, the response of a session software layer to a request from a presentation layer.

FIG. 26 illustrates the functions performed by the session software layer in response to requests being sent from the presentation layer. Decision block 2601 determines whether the request is a setup request. If it is a setup request, then a half call is established at the session software layer by execution of blocks 2602 and 2603. Block 2604 interprets the dialed number which was provided by the application to determine the destination node. Block 2609 then sends a setup request to the transport software layer.

Returning to decision block 2601, if the request is not a setup request, then decision block 2605 determines whether it is a release request. If it is a release request, then block 2606 removes the session record and transfers the release request to block 2607 for communication to the transport software layer. Returning to decision block 2605, if the answer is no, then block 2608 simply sends the request to the transport software layer for communication to the terminal or switching node which is engaged in a call with the application.

Before describing in greater detail the actions taken by software layers 531, 532, and 533 of FIG. 22 in implementing the redirect message, consider how the redirect message is coded. ISDN signaling is defined by the ISDN standard Q.931 and is intended to provide an international standard to control the initiation of calls, progress of calls, termination of calls, communication of national use information, local serving network information, and user-specific information for telecommunications systems and terminals. The redirect message information is coded as a vendor type message using conventional techniques. For a vendor or national type message, the first octel (which defines the message type) is an escape code which causes the switching node to examine the second octel to determine if the message is a national or vendor-type message.

To understand how these software layers respond to the redirect message, consider the example where a telephone call is being set up between BRI station set 126 and BRI station set 123 using only node and dialing plan hierarchical information. Recall that the setup message is initially routed from BRI station set 126 to switching node 102 via switching nodes 109, 104, and 101. When the setup message is routed to switching node 102 from switching node 101, the latter switching node determines that the call path needs to be set up back through from switching node 101. Switching node 102 utilizes the redirect message to remove the call path between switching node 102 and switching node 101 and to inform switching node 101 to determine another path. The redirect message sent by switching node 102 specifies that the node number has changed and specifies that this new switching node number is the node number for switching node 101. Switching node 101 is responsive to the redirect message to interrogate its level 5 routing table with the telephone number of BRI station set 123 and to determine that a setup message should be sent to switching node 111.

Consider the operation performed by switching node 102 with respect to FIG. 22. As the setup message is received, it progresses up through software layers 531, 532, and 533 along the left call leg of the call (call record 1421 and LDCN 1419). When the setup message is received by session software layer 533, it interrogates the level five routing tables and determines that the destination switching node is switching node 101. Session software layer 533 then transmits a setup request to transport software layer 532 along the right call leg of FIG. 22 (call record 1444 and LDCN 1441 ). However, when transport software layer 532 receives the setup request from session software layer 533, transport software layer 532 determines that a circular subpath would be set up between switching node 102 and 101. Consequently, transport software layer 532 transmits a redirect indication back to session software layer 532. Session software layer 533 is responsive to the redirect indication to remove session record 2207 and to send a redirect request to transport software layer 532 on the left call leg of FIG. 22. In turn, transport software layer 532 sends a redirect request to network software layer 531. The redirect request causes network software layer 531 to remove call record 1421, LDCN 1419, and CRN 1420 and to totally remove all lower protocols associated with this particular call. Also, network software layer 531 sends a redirect message to switching node 101.

Examine the operations, with respect to FIG. 22, performed by switching node 101 in response to the redirect message received from switching node 102. Switching node 101 had initially received a setup message from switching node 104, and this setup message set up the left call leg illustrated in FIG. 22 (call record 1421 and LDCN 1419 with session record 2207 controlling both legs). In response to this setup message, session software layer 533 transmits a setup request to transport software layer 532 via the right call leg of FIG. 22 to switching node 102. When switching node 102 transmits the redirect message back to switching node 102, the redirect message is received on the right call leg of FIG. 22. Software layers 533, 532, and 531 must remove the call that had been attempted to be established to switching node 102; however, call record 1444 and session record 2207 are preserved for use in the path that will be established between switching node 101 and switching node 111. In response to redirect message, network software layer 531 and lower layers remove the call to switching node 102 just as if a release message had been received from switching node 102. In response to the redirect indication, session software layer 533 determines that the call should be connected to switching node 111 and transmits a setup message to transport software layer 532 requesting that call be setup to switching node 111. Transport software layer 532 is responsive to the setup request received from session software layer 532 to select a new call record and a new LDCN (which are still denoted as call record 1444 and LDCN 1441 in FIG. 22) and to transmit the setup request to network software layer 531 via the right call leg of FIG. 22.

Consider now in greater detail how the redirect message is processed by session software layer 533 and transport software layer 532 in FIGS. 23 through 25. Consider first how switching node 102 responds to the setup message from switching node 101 to transmit a redirect message back to switching node 101. The setup message is received in the left call leg of FIG. 22. The setup message is received by network software layer 531 in switching node 102, and a setup indication is transmitted up to transport software layer 532 as was previously discussed. When transport software layer 532 receives the setup indication, it processes this indication as indicated in FIG. 23 by executing blocks 2301, 2302, 2304, and 2305 as was previously described. Since the node number indicates that the destination switching node is switching node 102, block 2306 is executed to set the node flag to indicate that the designation number equals the present node number after the decision is made by decision block 2305. Transport software layer 532 then sends a setup indication to software layer 533.

Session software layer 533 of switching node 102 processes the setup indication as illustrated in FIG. 25 by executing decision blocks 2501 and 2502. Since the node flag was set to indicate that the present node number equals the destination node number, decision blocks 2508 and 2513 are executed with the determinations being "no" in both cases resulting in block 2519 being executed. Upon block 2519 being executed, the session software layer 533 of switching node 102 determines that the block of numbers containing the telephone number of BRI station set 123 had been given to switching node 101. Decision block 2520 determines that a designation node was found in block 2519 and causes blocks 2522, 2523, and 2524 to be executed which result in a call record and a setup session record being obtained and a setup request being transmitted in the right hand call leg of FIG. 22 to transport software layer 532 of switching node 102.

This setup request is processed by transport software layer 532 in accordance with FIG. 24. Decision blocks 2401, 2402, and 2404 are executed with "yes" determinations resulting. Since the answer to the determination posed by decision block 2404 is "yes", block 2408 is executed resulting in a path being determined to switching node 101 via PRI link 150. Consequently, the answer to decision block 2409 is "yes", and the answer to decision block 2410 is "yes" since the route is circular resulting in block 2412 being executed. The execution of block 2412 results in a redirect indication being communicated to session software layer 533 along the right call leg of FIG. 22 and the node flag being set equal to the destination number not equaling the present node number. In this situation of a redirect indication being communicated to session software layer 533 along the right call leg, the node flag is utilized to indicate to the session software layer 533 that transport software layer 532 had determined a circular subpath.

At session software layer 533, the redirect indication is processed as illustrated in FIG. 25. Decision blocks 2501, 2527, and 2530 produce "no" determinations resulting in decision block 2533 being executed. Decision block 2533 determines whether the indication from the transport software layer was a redirect indication. Hence, the determination made by decision block 2533 is "yes". In response to this "yes" determination, decision block 2541 is executed resulting in the execution of block 2542 since the node flag is set to indicate that the destination node number does not equal the present node number. Execution of block 2542 results in a redirect request being communicated to transport software layer 532 for the left call leg of FIG. 22. Session software layer 533 removes session record 2207, and the redirect request specifies that the destination number is to be the node number of switching node 101. As will be described shortly, this results in a redirect message being sent back to switching node 101.

Transport software layer 532 is responsive to the redirect request to process this request as illustrated in FIG. 24. The determination made by decision block 2401 is "no" resulting in the execution of decision block 2423. Since it is a redirect request, decision block 2428 transfers control to block 2429 which transmits a redirect request to network software layer 531 along the left call leg of FIG. 22. Network software layer then transmits a redirect message to switching node 101. As the redirect request is processed by network software layer 531 and lower software layers, these software layers respond to the redirect request to clear the call with switching node 101 as if the redirect request was a release request.

Consider now how switching node 101 responds to the redirect message received from switching node 102. Network software layer 531 in switching node 101 is responsive to the redirect message to remove the lower level portions of the call including LDCN and call record along the right call leg of FIG. 22 and to transmit a redirect indication to transport layer 532 which is processed as indicated in FIG. 23. Upon execution of decision block 2301, control is transferred to decision block 2318 since the indication is not a setup indication. Since the call had previously been put in the setup state, control is transferred from decision block 2318 to decision block 2313. The latter decision block transfers control to decision block 2312 which in turn transfers control to decision block 2323. Since the indication is a redirect indication, control is transferred to decision block 2324 by decision block 2323. Decision block 2324 makes the decision of whether or not the redirect message is a redirect from a switching node to alter routing or is a redirect from a BRI station set to implement a feature such as send all calls. Such a feature is described in our copending application entitled "Redirection of Calls by a Communication Terminal" filed on the same day as the present application and assigned to the same assignee. This decision is based on whether or not a destination node number is present in the redirect message. If a destination node number is present in the redirect message, this means that the message is from a switching node and is to effect the routing of a call. However, if there is no destination node number present in the redirect message, this is interpreted as being from BRI station set or some other communication terminal. In the present situation, there is a destination node number present which is the node number of switching node 101. Therefore, control is passed from decision block 2324 to decision block 2325. Since the destination number is equal to the present node number, control is passed from decision block 2325 to block 2329. As will be seen shortly, the path starting at block 2329 is one in which the session software layer will look at the dialed telephone number to determine a route.

Returning momentarily to decision block 2325, if the answer to this determination was "no" indicating that routing was to be to another switching node, block 2326 obtains a new call record for the right call leg of FIG. 22 and transfers control to block 2408 of FIG. 24 so that a route can be determined to this new destination switching node. Returning now to block 2329, the latter block sets the node flag to indicate that the destination node number is equal to the present node number and executes block 2330 which sends a redirect indication to session software layer 533.

Session software layer 533 of switching node 101 is responsive to the redirect indication from the transport software layer to process this indication as illustrated in FIG. 25. In FIG. 25, decisions blocks 2501, 2527, and 2530 are executed resulting in "no" determinations and execution of decision block 2533. Since the indication is a redirect indication, the execution of decision block 2533 results in decision block 2541 being executed. Since the node flag does indicate that the present node number is the destination node number, decision block 2543 is executed. Note, if the determination in decision block 2541 was "no" block 2542 would have been executed which would have resulted in a setup request for a different switching node than switching node 101 being transmitted to the transport software layer using the same session record that had been utilized when attempting to set up a call path to switching node 102. Returning now to decision block 2543. Since the destination terminal is not connected to switching node 101, block 2545 is executed rather than block 2544. Block 2545 searches the level five routing table utilizing the telephone number of the destination terminal. This search results in the switching node number being determined to be that of switching node 111. Since a switching node was found, decision block 2546 results in block 2548 being executed which transmits a setup request down to transport software layer 532 of switching node 101. The setup request uses the same session record as was utilized when a call was attempted to be set up to switching node 102, but a new call record is obtained.

Transport software layer 532 of switching node 101 is responsive to the setup request from the session software layer to process this request as illustrated in FIG. 24 and as previously described.

Internal Configuration Identification

At initialization time, each component of a switching module runs internal diagnostics on itself and then transfers its identification and results of the internal diagnostics to the angel processor controlling the module. As illustrated in FIG. 5, there are two types of modules. A remote module, such as remote module 511, is physically remoted from node processor 510 via a BRI or PRI link. A local module (such as one comprising local angel 512, network 515, interface 516, and interface 517) is physically located in the same board carder with a node processor (such as node processor 510) with the node processor implementing the local angel in software. The process of doing internal configuration identification is described with respect to remote module 511; however, a local module performs similar operations.

Figure 27:
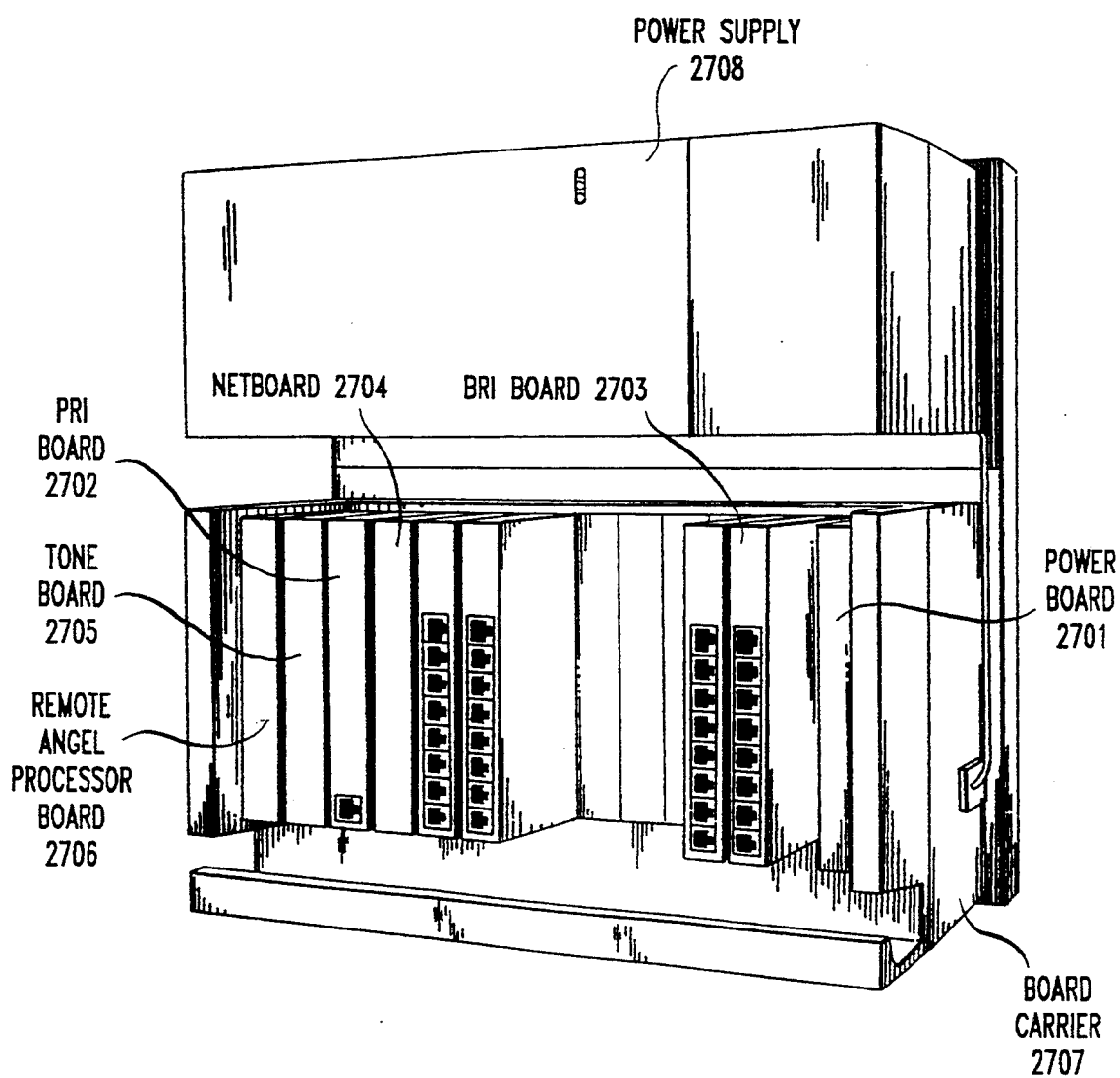
FIG. 27 illustrates a front view of a remote module in a board carrier.
Figure 28:
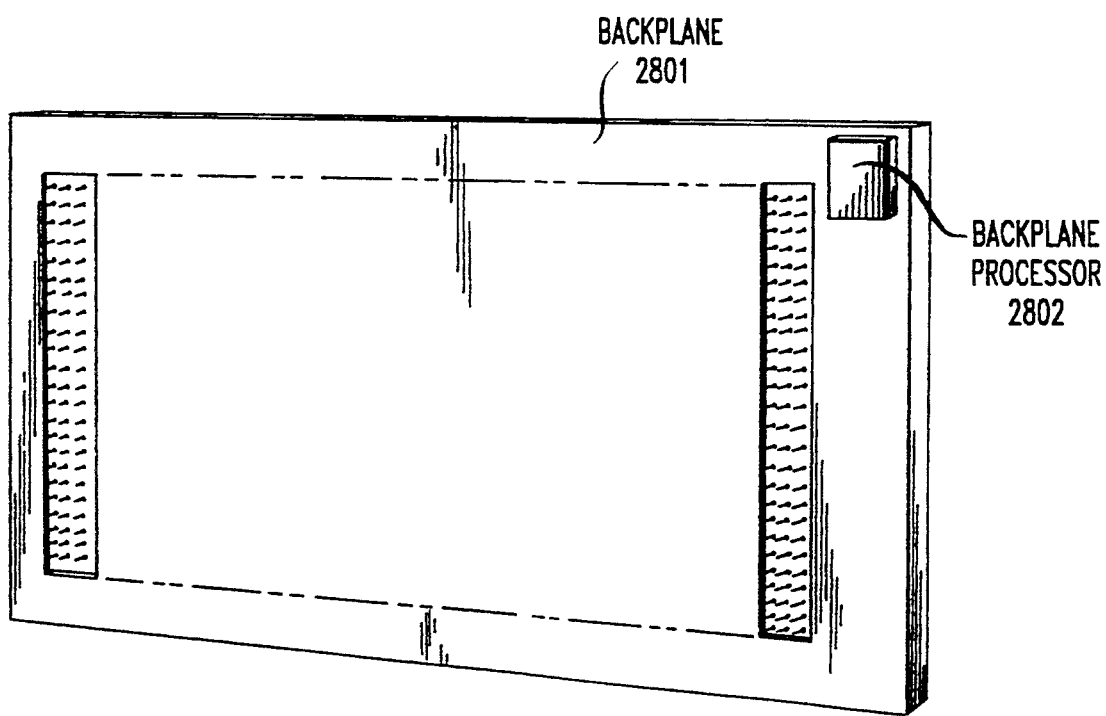
FIG. 28 illustrates a rear view of a remote module in a board carrier.

A front view of remote module 511 is illustrated in FIG. 27 and a back view is illustrated in FIG. 28. As illustrated in FIG. 27, remote module 511 comprises printed circuit boards 2701 through 2706 which are physically mounted in board carrier 2707. These boards plug in to backplane 2008, as illustrated in FIG. 28, which is attached to carder 2707. Each of the boards illustrated in FIG. 27 has a processor for running initial diagnostics on the circuits of that board and also for reporting the identification of the board to the remote angel processor 520 which is physically mounted on remote angel processor board 2706.

In addition, as illustrated in FIG. 28, backplane 2801 has physically mounted on it backplane processor 2002. Backplane processor 2002 provides information denoting the backplane type of backplane 2001, the number of boards plugged into backplane 2001, and the location of each board.

Network 529 of FIG. 5 is physically implemented by network board 2704, and interface 527 of FIG. 5 is implemented on PRI board 2702. Auxiliary circuits are mounted on tone board 2705. Power board 2701 provides the necessary power to the boards plugged into backplane 2801. Power supply 2708 supplies power to power board 2701. A local module consists of boards similar to those illustrated in FIG. 27 with the exception that a node processor board replaces angel processor board 2706.

Figure 29:
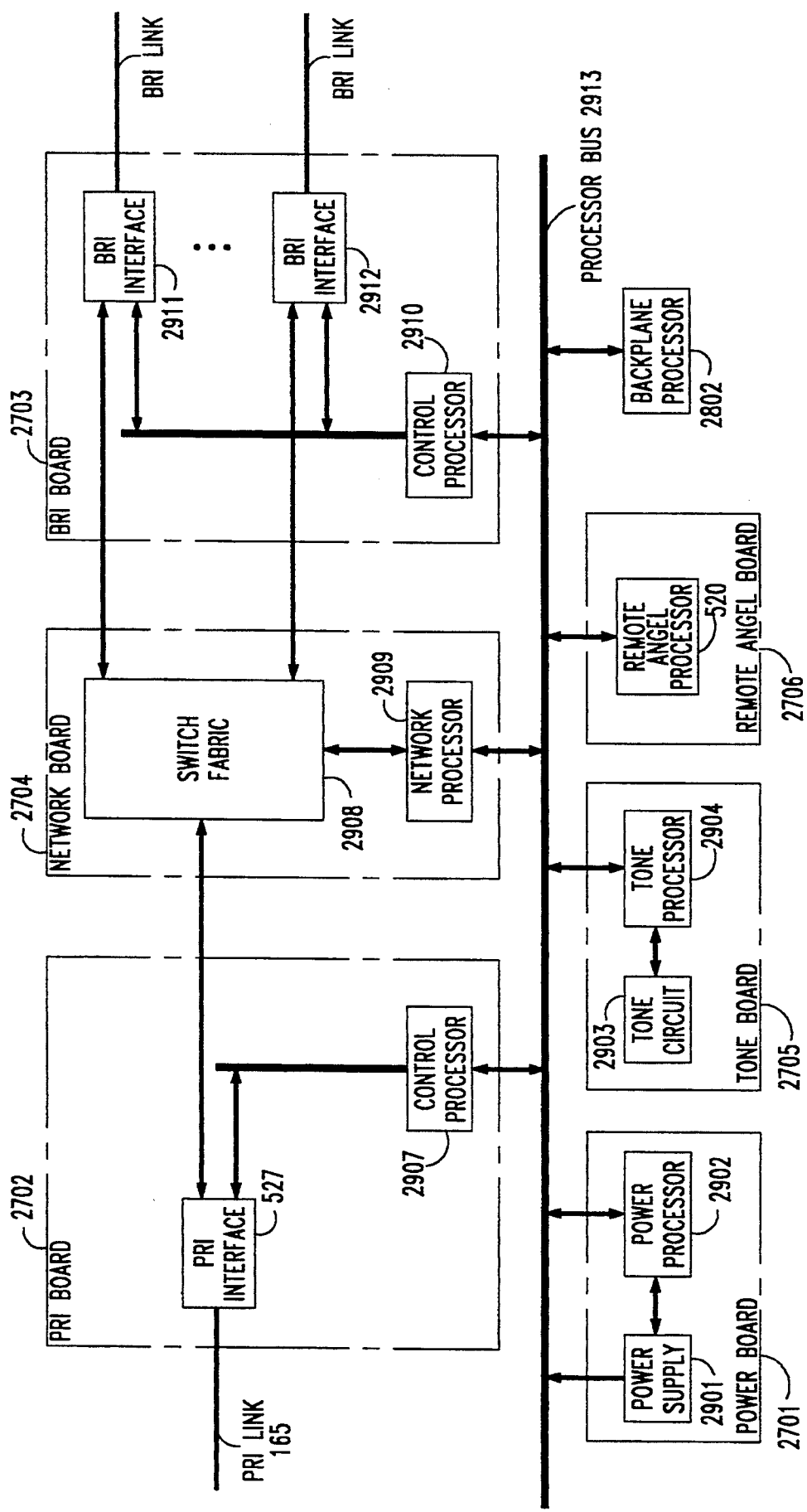
FIG. 29 illustrates, in block diagram form, a remote module.

FIG. 29 illustrates, in block diagram form, remote module 511. All of the processors illustrated in FIG. 29 communicate with each other via processor bus 2913. When remote module 511 is first initialized, power processor 2002 determines whether power supply 2001 is operational and the type of power supply as to voltages and output power. Power processor 2002 then transfers this information to remote angel processor 520. Similarly, tone processor 2904 performs diagnostics on tone circuit 2903 to ascertain whether this circuit is fully operational. Tone processor 2904 then reports the results of its diagnostics and the tone board type of tone board 2705 to remote angel processor 520 via processor bus 2913. Backplane processor 2802 determines the number and location of boards plugged into backplane 2801 of FIG. 28 and transmits this information to remote angel processor 520 via processor bus 2913. Network processor 2909 performs diagnostics and identifies the fabric type of switch fabric 2908 to remote angel processor 520. Switch fabric 2908 can be a variety of different types of switching technology, i.e. optical switching for broadband communications. Control processors 2907 and 2910 perform diagnostics on their respective boards and report the results of these diagnostics and the type of board along with the number of interface circuits to remote angel processor 520 via processor bus 2913.

After all of the information has been reported to remote angel processor 520, the latter processor transmits this information to node processor 510 via switch fabric 2908 and BRI interface 2911. Angel processor 520 communicates information with BRI interface 2911 via processor bus 2913 and control processor 2911. The manner in which node processor 510 is interconnected to remote module 511 by a BRI link is discussed in our U.S. patent application, Ser. No. 07/636,528, of B. M. Bales et al. 5-1-2-1, filed Dec. 31, 1990, entitled "Transport Remoting of Switch Network Control Over a Standard Interface Link", having the same inventors and assignee as the present application.

It is to be understood that the above-described embodiments are merely illustrative of the principles of the invention and that other arrangements may be devised by those skilled in the art without departing from the spirit and scope of the invention. In particular, other software and hardware structures may be used to implement the invention. Further, it would be apparent to one skilled in the art that the invention could be applied to switching systems other than telecommunication switching systems.

We claim:

1. A method for administering a dialing plan of a telecommunication switching system having a plurality of switching nodes, comprising the steps of:

informing each switching node of blocks of telephone numbers that each switching node is to own;

arranging the switching nodes in hierarchical groups with a highest hierarchical group comprising only one switching node that owns all of the telephone numbers upon initialization;

requesting by each switching node in hierarchical groups other than the highest hierarchical group permission to own a subset of the blocks of a set of telephone numbers from the switching node in a higher hierarchical group and presently owning the set of the blocks of telephone numbers; and giving permission by each switching node upon receiving a request from a switching node in a lower hierarchical group to own the subset of the set of blocks of telephone numbers owned by each owning switching node to the requesting switching node.

2. The method of claim 1 wherein each of the switching nodes has an unique switching node number and the step of giving comprises the step of storing the switching node number of the requesting switching node and an identification of the subset of the set of the blocks of telephone numbers given to the requesting switching node.

3. The method of claim 2 further comprises the steps of requesting permission from a switching node owning a block of the telephone numbers to host one of the telephone numbers of that block of the telephone numbers by another switching node; and granting permission by the switching node owning the one of the telephone numbers to the other switching node to host the one of the telephone numbers.

4. The method of claim 3 further comprises the step of recording the switching node number of the switching node requesting permission to host and recording an identification of the one of the telephone numbers.

5. The method of claim 4 wherein the step of requesting permission to own the subset of the blocks of telephone numbers comprises the step of determining a route to the switching node in the higher hierarchical group owning the set of blocks of the telephone numbers.

6. The method of claim 5 wherein a switching node number of a switching node defines the switching node position in a switching node hierarchy of the telecommunication switching system and the step of determining a route comprises the step of using the switching node number of the switching node requesting ownership of the subset of the set of blocks of the telephone numbers and the switching node number of the switching node owning the set of blocks of the telephone numbers.

7. The method of claim 6 wherein the step of granting permission to host the one of the telephone numbers comprises the step of directing a message from the other switching node to the switching node originally owning the set of blocks of the telephone numbers in which the one of the telephone numbers is included by the switching node presently owning the subset of the set of blocks of the telephone numbers before permission was given to the presently owning switching node.

8. The method of claim 1 wherein the telecommunication switching system further has a system management unit and the step of informing is performed by the system management unit.

9. A method for administering a dialing plan of a telecommunication switching system having a plurality of switching nodes, comprising the steps of:
informing each switching node of blocks of telephone numbers that each switching node is to own;
arranging the switching nodes in hierarchical groups with a highest hierarchical group comprising only one switching node that owns all of the telephone numbers upon initialization;
requesting by a first switching node in a hierarchical group other than the highest hierarchical group permission to own a subset a set of the blocks of telephone numbers from a second switching node in a higher hierarchical group and presently owning the set of the blocks of telephone numbers; and
giving permission to the first switching node by the second switching node upon receiving the request from the first switching node.

10. The method of claim 9 wherein each of the switching nodes has an unique switching node number and the step of giving comprises the step of storing the switching node number of the first switching node and an identification of the subset of the set of the blocks of telephone numbers.

11. The method of claim 10 further comprises the steps of requesting permission from the first switching node to host the one of the telephone numbers by the third switching node; and
granting permission by the first switching node to the third switching node to host the one of the telephone numbers.

12. The method of claim 11 further comprises the step of recording the switching node number of the third switching node and recording an identification of the one of the telephone numbers.

13. The method of claim 12 wherein the step of requesting permission to own the subset of the set of the blocks of telephone numbers comprises the step of determining a route to the second switching node.

14. The method of claim 13 wherein a switching node number of a switching node defines the switching node position in a switching node hierarchy of the telecommunication switching system and the step of determining a route comprises using the switching node number of the second switching node and the switching node number of the first switching node.

15. The method of claim 14 wherein the step of granting permission to host the one of the telephone numbers comprises the step of directing a message from the third switching node to the second switching node by the first switching node upon the one of the telephone numbers being included in the subset of the set of blocks of the telephone numbers.

16. The method of claim 9 wherein the telecommunication switching system further has a system management unit and the step of informing is performed by the system management unit.

17. An apparatus for administering a dialing plan of a telecommunication switching system having a plurality of switching nodes, comprising:
means for informing each switching node of blocks of telephone numbers to be owned by each switching node;
the switching nodes arranged in hierarchical groups with a highest hierarchical group comprising only one switching node that owns all of the telephone numbers upon initialization;
means in a first switching node in a hierarchical group other than the highest hierarchical group for requesting permission to own a subset of a set of the blocks of telephone numbers from a second switching node in a higher hierarchical group and presently owning the set of the blocks of telephone numbers; and
means in the second switching node for giving permission to the first switching node upon receiving the request from the first switching node.

18. The apparatus of claim 17 wherein each of the switching node has an unique switching node number and the means for giving comprises means for storing the switching node number of the first switching node and an identification of the subset of the set of the blocks of telephone numbers.

19. The apparatus of claim 18 further comprises means in a third switching node for requesting permission to use for identification purposes one of the telephone numbers owned by the first switching node; and
means in the first switching node for granting permission to the third switching node to host the one of the telephone numbers.

20. The apparatus of claim 19 further comprises means in the first switching node for recording the switching node number of the third switching node and recording an identification of the one of the telephone numbers.

21. The apparatus of claim 20 wherein means for requesting permission to own the subset of the set of the blocks of telephone numbers comprises means for determining a route to the second switching node.

* * * * *